US012617067B2

(12) United States Patent
Urano et al.

(10) Patent No.: US 12,617,067 B2
(45) Date of Patent: May 5, 2026

(54) IMPACT TOOL, SPINDLE, AND SPINDLE MANUFACTURING METHOD

(71) Applicant: MAKITA CORPORATION, Anjo (JP)

(72) Inventors: Shinichi Urano, Anjo (JP); Tomoyuki Kurata, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 18/903,033

(22) Filed: Oct. 1, 2024

(65) Prior Publication Data

US 2025/0108498 A1 Apr. 3, 2025

(30) Foreign Application Priority Data

Oct. 3, 2023 (JP) ................................ 2023-171993

(51) Int. Cl.
*B25B 21/02* (2006.01)
*B21K 1/10* (2006.01)
(Continued)

(52) U.S. Cl.
CPC ................ *B25F 5/001* (2013.01); *B21K 1/10* (2013.01); *B25B 21/02* (2013.01); *B25B 23/0035* (2013.01)

(58) Field of Classification Search
CPC ........... B25F 5/001; B21K 1/10; B25B 21/02; B25B 23/0035; B25B 21/026
(Continued)

(56) References Cited

U.S. PATENT DOCUMENTS 7,971,654 B2 7/2011 Takeyama et al.
8,674,640 B2 * 3/2014 Suda ...................... B25B 21/02 173/4

(Continued)

FOREIGN PATENT DOCUMENTS

CN 116833957 A * 10/2023 ............ B25D 16/00
DE 202020107604 U1 * 1/2021 ............ B25B 21/02

(Continued)

OTHER PUBLICATIONS

Unpublished U.S. Appl. No. 18/903,036, first named inventor: Yasuhito Kawai, filed Oct. 1, 2024.

(Continued)

*Primary Examiner* — Robert F Long
(74) *Attorney, Agent, or Firm* — J-TEK LAW PLLC; Jeffrey D. Tekanic; Scott T. Wakeman

(57) ABSTRACT

An impact tool includes: a motor; a sun gear rotated by the motor; and at least three planet gears, which mesh with the sun gear; an internal gear, which meshes with the planet gears. A spindle includes a flange portion having a hole in an axial direction for the insertion of the sun gear, and slit portions in at least a side surface thereof for mounting the planet gears, and a shaft portion extending forward from the flange portion in the axial direction. The flange portion is shaped by forging. A hammer is held on the spindle; an anvil is impacted by the hammer in a rotational direction. A hammer case houses the hammer and holds the anvil in a rotatable manner; a tool-accessory retaining part is formed on the anvil; and a coil spring biases the hammer toward the anvil.

20 Claims, 18 Drawing Sheets

(51) Int. Cl.
*B25F 5/00* (2006.01)
*B25B 23/00* (2006.01)

(58) Field of Classification Search
USPC ........ 173/81, 90, 140–141, 162.1, 197, 198, 173/213, 168–171
See application file for complete search history.

(56) References Cited

U.S. PATENT DOCUMENTS

| | | | | |
|---|---|---|---|---|
| 2002/0185514 | A1* | 12/2002 | Adams | B25C 1/008 227/2 |
| 2008/0308286 | A1* | 12/2008 | Puzio | B25B 21/00 173/210 |
| 2010/0071923 | A1* | 3/2010 | Rudolph | B25D 16/006 173/48 |
| 2010/0078186 | A1 | 4/2010 | Takeyama et al. | |
| 2013/0255982 | A1* | 10/2013 | Takahashi | B25B 21/02 173/47 |
| 2018/0361558 | A1* | 12/2018 | Fuchs | B25F 5/001 |
| 2021/0078146 | A1* | 3/2021 | Araki | B25F 5/001 |
| 2021/0162574 | A1* | 6/2021 | Dedrickson | B25D 17/06 |
| 2022/0193878 | A1* | 6/2022 | Tomayko | B25B 21/02 |
| 2023/0069547 | A1* | 3/2023 | Kato | H02J 7/0045 |
| 2023/0191566 | A1* | 6/2023 | Kamiya | B25B 21/026 173/93 |
| 2023/0202004 | A1* | 6/2023 | Tamura | B25B 21/026 173/93 |
| 2023/0234193 | A1* | 7/2023 | Xu | B25B 21/02 173/93 |
| 2024/0123581 | A1* | 4/2024 | Ji | B25B 21/02 |
| 2024/0238948 | A1* | 7/2024 | Suzuki | B25B 21/02 |
| 2024/0308046 | A1* | 9/2024 | Nick | B25B 21/026 |
| 2024/0326205 | A1* | 10/2024 | Kinoshita | B25B 23/0035 |
| 2024/0342873 | A1* | 10/2024 | Smith | H02K 29/08 |
| 2025/0025990 | A1* | 1/2025 | Sun | H02P 6/24 |
| 2025/0073866 | A1* | 3/2025 | Tomayko | B25F 5/001 |

FOREIGN PATENT DOCUMENTS

| | | | | | |
|---|---|---|---|---|---|
| DE | 102022127106 | A1 | * | 4/2023 | B25F 5/008 |
| EP | 4015153 | A1 | * | 6/2022 | B25F 5/001 |
| JP | 2006088323 | A | * | 4/2006 | B25B 21/004 |
| JP | 4600562 | B2 | | 12/2010 | |
| JP | 2021037561 | A | | 3/2021 | |
| JP | 2023090313 | A | * | 6/2023 | |
| JP | 7459535 | B2 | * | 4/2024 | |
| TW | 202438237 | A | * | 10/2024 | B25F 5/001 |
| WO | WO-2015182512 | A1 | * | 12/2015 | B25D 11/04 |
| WO | WO-2015182513 | A1 | * | 12/2015 | B25D 11/04 |
| WO | WO-2018155074 | A1 | * | 8/2018 | B25B 21/00 |
| WO | WO-2019167498 | A1 | * | 9/2019 | B25B 21/02 |

OTHER PUBLICATIONS

Unpublished U.S. Appl. No. 18/903,042, first named inventor: Yasuhito Kawai, filed Oct. 1, 2024.

* cited by examiner

IMPACT TOOL, SPINDLE, AND SPINDLE MANUFACTURING METHOD

CROSS-REFERENCE TO RELATED APPLICATION

This application claims priority to Japanese patent application no. 2023-171993 filed on Oct. 3, 2023, the contents of which are fully incorporated herein by reference.

TECHNICAL FIELD

The techniques disclosed in the present specification relate to an impact tool, a spindle, and a method of manufacturing the spindle.

BACKGROUND ART

An impact tool related to the present teachings is disclosed in Japanese Laid-open Patent Publication No. 2021-037561.

SUMMARY OF THE INVENTION

It is one non-limiting object of the present teachings to disclose techniques for reducing the time required to manufacture the spindle for an impact tool.

In one non-limiting aspect of the present teachings, an impact tool may preferably comprise: a motor; a sun gear rotated by the motor; at least three planet gears, which mesh with the sun gear; an internal gear, which meshes with the planet gears; a spindle, which includes a flange portion—having a hole in an axial direction for the insertion of the sun gear, and slit portions in at least a side surface thereof for mounting the planet gears—and a shaft portion extending forward from the flange portion in the axial direction, at least a portion of the flange portion having been shaped (formed) by forging; a hammer, which is held on the spindle; an anvil, which is impacted by the hammer in a rotational direction; a hammer case, which houses the hammer and holds the anvil in a rotatable manner; a tool-accessory retaining part, which is provided on the anvil; and a coil spring, which biases the hammer toward the anvil side.

By utilizing the spindle forging techniques disclosed in the present specification, an impact tool, a spindle, and a method of manufacturing method a spindle are provided in which the time required for manufacturing can be reduced.

DETAILED DESCRIPTION

Figure 1:
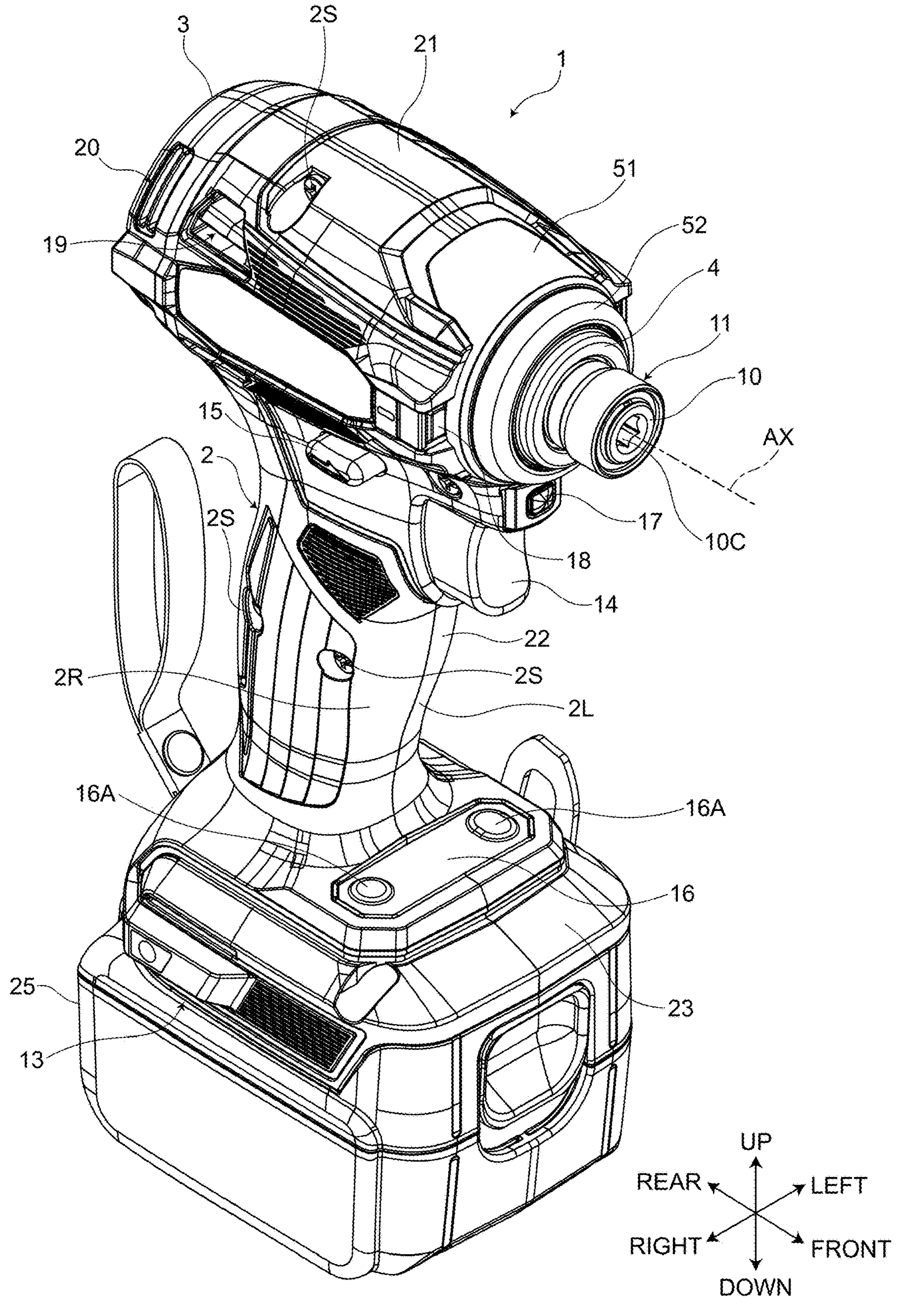
FIG. 1 is an oblique view, viewed from the front, showing an impact tool according to an embodiment of the present teachings.
Figure 2:
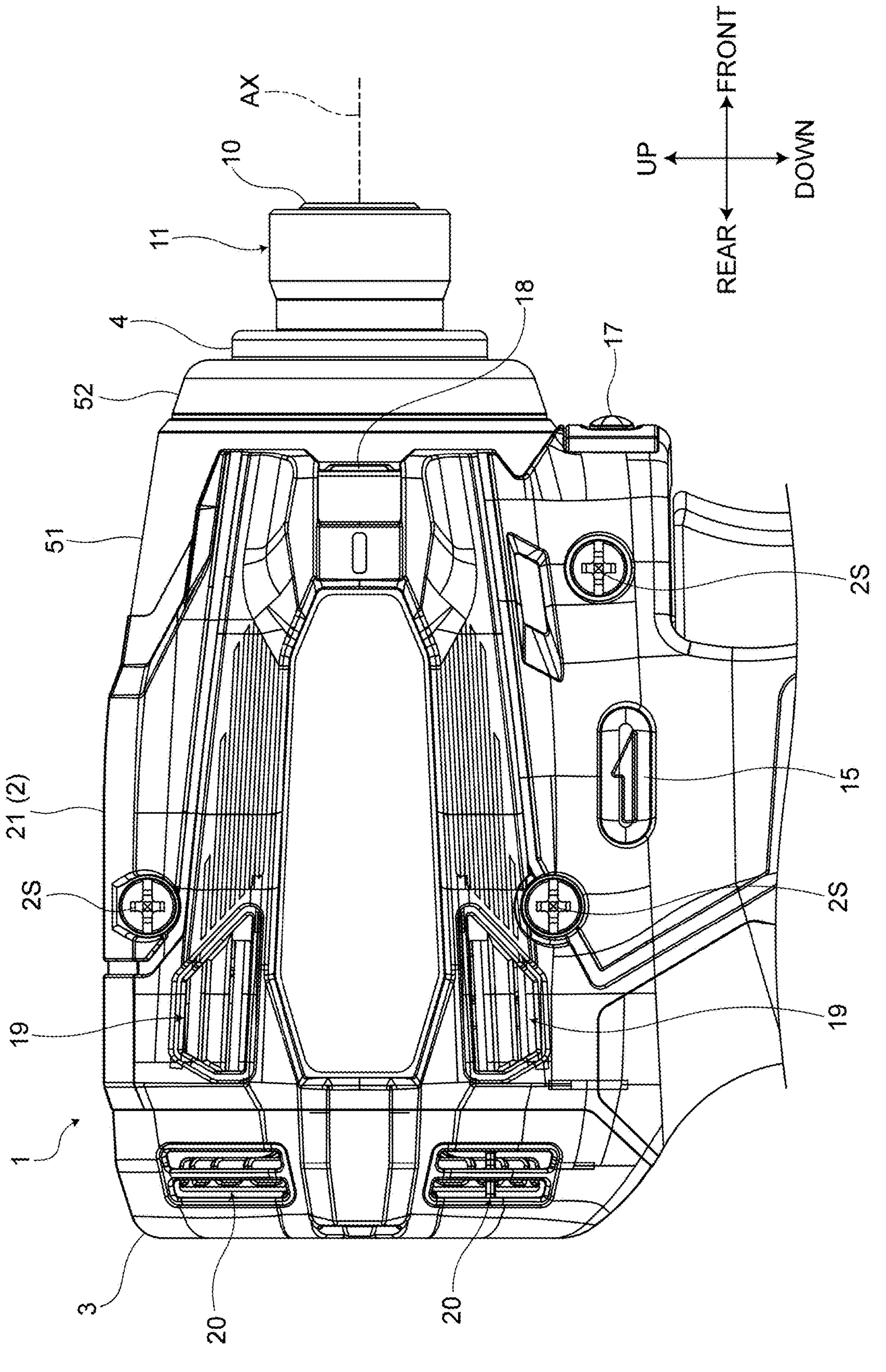
FIG. 2 is a side view showing an upper portion of the impact tool according to the embodiment.

As was mentioned above, an impact tool according to one aspect of the present teachings preferably comprises: a motor; a sun gear rotated by the motor; at least three planet gears, which mesh with the sun gear; an internal gear, which meshes with the planet gears; a spindle, which includes a flange portion—having a hole in an axial direction for the insertion of the sun gear, and slit portions in at least a side surface thereof for mounting the planet gears—and a shaft portion extending forward from the flange portion in the axial direction, at least a portion of the flange portion having been shaped (formed) by forging; a hammer, which is held on the spindle; an anvil, which is impacted by the hammer in a rotational direction; a hammer case, which houses the hammer and holds the anvil in a rotatable manner; a tool-accessory retaining part, which is provided on the anvil; and a coil spring, which biases the hammer toward the anvil side.

In the above-mentioned configuration, it is possible to reduce the time required for manufacturing the impact tool by employing the spindle which has been shaped (formed) by forging.

In one or more embodiments, the flange portion may include a cut surface on at least a portion of a surface.

In the above-mentioned configuration, the accuracy of the outer shape of the spindle can be improved, as needed and as appropriate, by cutting the surface of the flange portion was shaped (formed) by forging.

In one or more embodiments, the impact tool may further comprise a ball disposed between the spindle and the hammer, and the spindle may have, in the shaft portion, a spindle groove in which at least a portion of the ball is disposed.

In the above-mentioned configuration, the time required for manufacturing can be reduced when manufacturing a spindle that has, in the shaft portion, the spindle groove in which at least a portion of the ball is disposed.

In one or more embodiments, the spindle may be formed using a steel that contains 0.13 mass % or more and 1.00 mass % or less of carbon and 0.90 mass % or more of chromium. If all the forging steps described below will be performed under cold working conditions, then a cold working steel is preferred. On the other hand, if the slug will be prepared by forging under warm or hot working conditions, then a steel that is amenable to both cold working as well as warm or hot working is preferred.

In the above-mentioned configuration, it is possible to cause plastic deformation of the spindle as appropriate by forging, and thus it becomes possible to ensure the post-deformation strength thereof.

In one or more embodiments, grain flows (which may be referred to as fiber flows or metal flows) in the flange portion of the spindle may be formed by the forging such that the grain flows are directed going outward from the center of the radial direction at least in one or more portions of the flange portion, for example, at least in first and second flange portions of the spindle. Grain flow (fiber flow, metal flow) is the orientation of grains within the metal. When a force (pressure) is applied to the metal, non-metallic inclusions are deformed, and the directional orientation of the metal grains are changed. As a result, the grain flow changes. The grain flow in forging closely follows the outline (contour) of the product, thereby enhancing mechanical properties and impact strength of the forged component. Grain flows are typically observed using a microscope.

In the above-mentioned configuration, because at least some of the grain flows in the flange portion of the spindle have been formed by forging going outward from the center of the radial direction, an appropriate strength of the spindle can be ensured.

In one or more embodiments, the spindle may have a first flange, which is connected to the shaft portion; a second flange, which is disposed opposing the first flange and rearward of the first flange; and a coupling portion, which couples the first flange and the second flange to each other in the axial direction. The first and second flanges preferably extend in parallel to each other in the radial direction.

In the above-mentioned configuration, the time required for manufacturing can be reduced when manufacturing a spindle (in particular the flange portion thereof) configured to have the first flange, the second flange, and the coupling portion.

In one or more embodiments, a plurality of the coupling portions is disposed in (around) a circumferential direction; and each of the planet gears may be disposed respectively between the mutually adjacent coupling portions at a location sandwiched between the first flange and the second flange.

In the above-mentioned configuration, the time required for manufacturing can be reduced when manufacturing a spindle (in particular the flange portion thereof) configured with each of the planet gears disposed respectively between mutually adjacent coupling portions at a location sandwiched between the first flange and the second flange.

In one or more embodiments, a portion of the spindle which faces an opening that is surrounded by the first flange, the second flange, and the plurality of coupling portions may be a non-cut portion. In other words, such portion is preferably formed (shaped) solely by forging without performing any cutting operation thereon.

In the above-mentioned configuration, because each of the openings of the slit portions can be configured (formed) by corresponding non-cut portions, cutting need not be performed to form those openings.

In one or more embodiments, the spindle may be a spindle that is used in a power tool (preferably, an impact tool) and may comprise a flange portion—having a hole in an axial direction for the insertion of a sun gear, and a slit portion in at least a side surface thereof for mounting a planet gear—and a shaft portion extending forward from the flange portion, and at least a portion of the flange portion may be shaped (formed) by forging.

In the above-mentioned configuration, it is possible to reduce the time required for manufacturing the spindle (in particular the flange portion thereof) because at least a portion of the flange portion is shaped (formed) by forging.

In one or more embodiments, the flange portion may have (include) a cut surface on at least a portion of a surface.

In the above-mentioned configuration, the accuracy of the outer shape of the spindle can be improved, as needed and as appropriate, by cutting at least a portion the surface of the flange portion that was shaped (formed) by forging.

In one or more embodiments, the shaft portion may have a spindle groove, in which at least a portion of the ball is disposed.

In the above-mentioned configuration, the time required for manufacturing can be reduced when manufacturing a spindle that has, in the shaft portion, the spindle groove, in which at least a portion of the ball is disposed.

As was mentioned above, the spindle may be formed (composed) of a steel that contains 0.13% or more and 1.00% or less of carbon and 0.90% or more of chromium.

In the above-mentioned configuration, it is possible to achieve a suitable amount of plastic deformation of the spindle by forging, and thus it becomes possible to ensure sufficient post-deformation strength thereof.

In one or more embodiments, at least a portion of the grain flows in the flange portion may be formed by forging such that the grain flows extend radially outward from the center of the spindle in the radial direction (i.e. in the direction radially outward from the rotational axis of the spindle).

In the above-mentioned configuration, because at least a portion of the grain flows in the flange portion are formed by the forging such that the grain flows go (extend) outward from the center of the radial direction, an appropriate strength of the spindle can be ensured.

In one or more embodiments, the flange portion may have: a first flange, which is connected to the shaft portion; a second flange, which is disposed opposing the first flange and rearward of the first flange; and at least one coupling portion, which couples the first flange and the second flange to each other in the axial direction.

In the above-mentioned configuration, the time required for manufacturing can be reduced when manufacturing a spindle (in particular the flange portion thereof) configured to have the first flange, the second flange, and the at least one coupling portion.

In one or more embodiments, a plurality of the coupling portions may be disposed in a circumferential direction, and each of the planet gears may be disposed respectively between mutually adjacent coupling portions at a location sandwiched between the first flange and the second flange.

In the above-mentioned configuration, the time required for manufacturing can be reduced when manufacturing a spindle (in particular the flange portion thereof) configured with each of the planet gears disposed respectively between mutually adjacent coupling portions at a location sandwiched between the first flange and the second flange.

As was mentioned above, a portion of the flange portion that faces an opening surrounded by the first flange, the second flange, and the plurality of coupling portions may be a non-cut portion.

In the above-mentioned configuration, because each of the openings of the slit portions can be configured (formed) by (as) corresponding non-cut portions, cutting need not be performed to form those openings.

In one or more embodiments, in a method of manufacturing a spindle comprising a flange portion—having a hole in an axial direction for the insertion of a sun gear, and a slit portion in at least a side surface thereof for mounting a planet gear—and a shaft portion extending forward from the flange portion, the spindle being used in a power tool, the manufacturing method may comprise: (i) forming (providing) a slug (intermediate product, semi-finished product), which has a flange-corresponding portion and a shaft-corresponding portion that correspond to the flange portion and the shaft portion, respectively; (ii) disposing (arranging, providing), with respect to the flange-corresponding portion of the slug, a die in which at least one slit-corresponding part, corresponds to at least one slit portion, is formed (defined); and (iii) forming a slit portion by forging, in which, in the state in which the die is disposed, a rear-end portion of the flange-corresponding portion is struck in the axial direction to cause plastic deformation of the flange-corresponding portion along the slit-corresponding part of the die. As used herein, the term "slug" is intended to have the meaning of "a piece of metal that has been roughly shaped for subsequent processing" and is intended to be synonymous with terms such as "intermediate product" or "semi-finished product".

In the above-mentioned configuration, in the state in which the die—in which the slit-corresponding part(s), which correspond(s) to the slit portion(s), is (are) formed—is disposed with respect to the flange-corresponding portion of the slug, the slit portion(s) is (are) formed by forging, in which the rear-end portion of the flange-corresponding portion is struck in the axial direction to cause plastic deformation of the flange-corresponding portion along the slit-corresponding part(s) of the die. Accordingly, the time required for manufacturing the spindle can be reduced because the slit portion(s) can be formed efficiently by forging.

In one or more embodiments, the flange portion of the spindle may have (include) a hole in the axial direction for the insertion of a sun gear, and the manufacturing method may further comprise a step of forming the hole by cutting the flange-corresponding portion after the plastic deformation of the flange-corresponding portion.

In the above-mentioned configuration, because the hole is formed by cutting after the slit portion(s) has (have) been formed by forging, the time required for manufacturing the spindle can be reduced compared to an embodiment in which both the slit portion and the hole are formed by cutting.

In one or more embodiments, the slug may be formed by forging in which the temperature of the material is −20° C. or higher and 40° C. or lower (cold working), 300° C. or higher and 850° C. or lower (warm working), or 1,000° C. or higher and 1,250° C. or lower (hot working); and the spindle may be formed by further forging the slug in the state in which the temperature of the slug is −20° C. or higher and 40° C. or lower (cold working). It is noted that, when forging the slug, the temperature of the slug may be any temperature as long as it is in the range of −20° C. or higher and 1,250° C. or lower.

In the above-mentioned configuration, the slug can be manufactured appropriately, and the spindle can be appropriately manufactured using that appropriately manufactured slug.

In one or more embodiments, the spindle may be further treated (preferably, heat treated) after formation by forging so that the surface hardness thereof becomes 300 HV or more.

In the above-mentioned configuration, it becomes possible to ensure sufficient strength of the spindle because the surface hardness thereof after formation by forging becomes 300 HV or more by the heat treatment. It is noted that any process may be performed as the heat treatment as long as it is a process that causes a property of the material of the spindle (in particular, the surface hardness) to change (increased). Representative, non-limiting of heat treatments that may be performed on the spindle include, e.g., quenching—such as, immersion quenching, carburizing and quenching, carbonitriding and quenching, and induction hardening—or an age-hardening process, etc.

Embodiments according to the present disclosure will be explained below, with reference to the drawings, but the present disclosure is not limited to these embodiments. Structural elements of the embodiments explained below can be combined where appropriate. In addition, there are also situations in which some structural elements are not used.

In the embodiments, positional relationships among the parts are explained using the terms left, right, front, rear, up, and down. These terms indicate relative position or direction, wherein the center of an impact tool is the reference.

The impact tool comprises a motor. In the embodiments, the direction parallel to rotational axis AX of the motor is called the axial direction where appropriate, the direction that goes around rotational axis AX is called the circumferential direction or the rotational direction where appropriate, and the radial direction of rotational axis AX is called the radial direction where appropriate.

In the embodiments, rotational axis AX extends in a front-rear direction. The axial direction and the front-rear direction coincide with each other. One side in the axial direction is forward, and the other side in the axial direction is rearward. In addition, in the radial direction, a location that is proximate to or a direction that approaches rotational axis AX is called radially inward where appropriate, and a location that is distant from or a direction that leads away from rotational axis AX is called radially outward where appropriate.

FIG. 1 is an oblique view, viewed from the front, that shows an impact tool 1 according to the embodiment. FIG.

Figure 3:
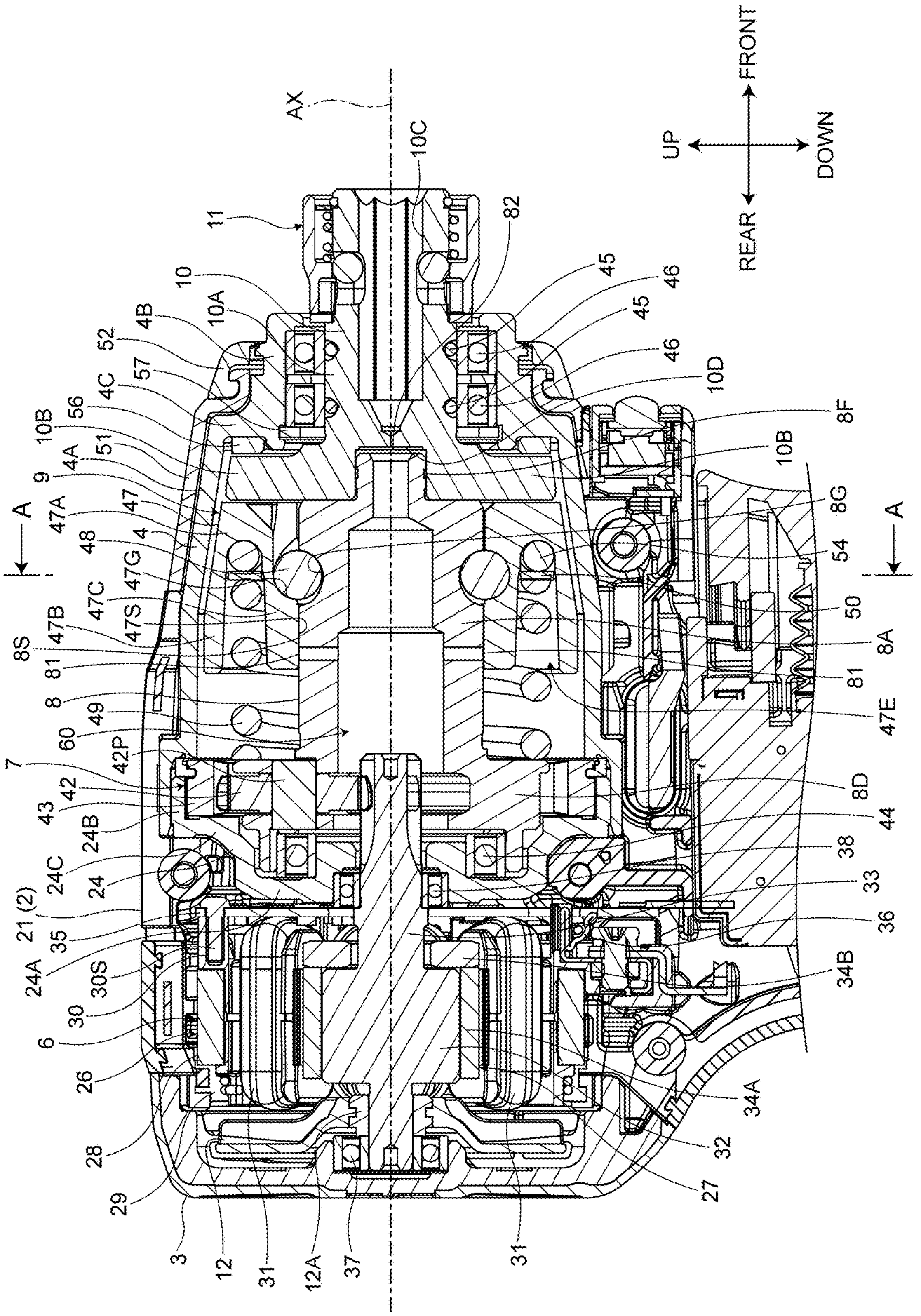
FIG. 3 is a longitudinal, cross-sectional view showing the upper portion of the impact tool according to the embodiment.
Figure 4:
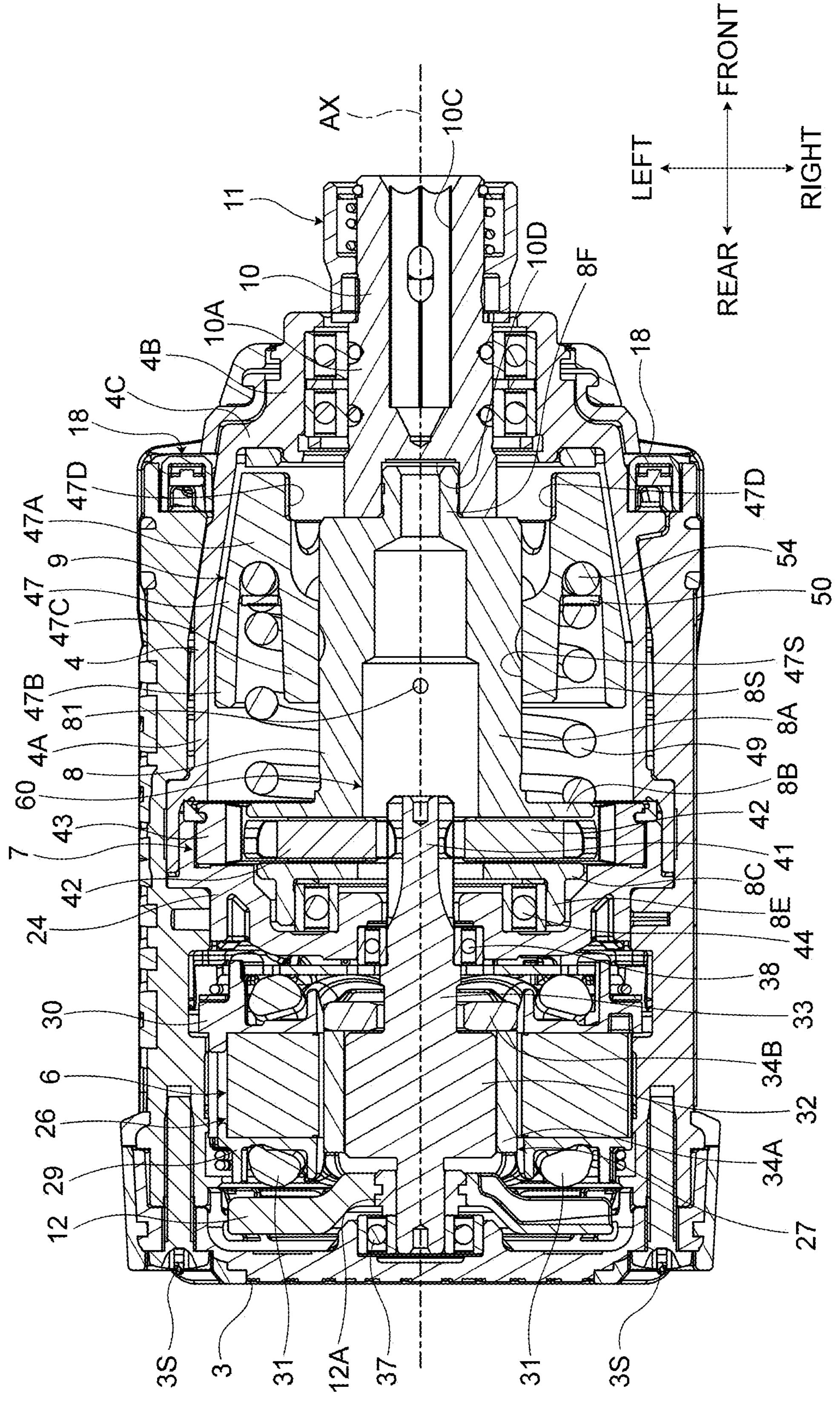
FIG. 4 is a transverse, cross-sectional view showing the upper portion of the impact tool according to the embodiment.
Figure 5:
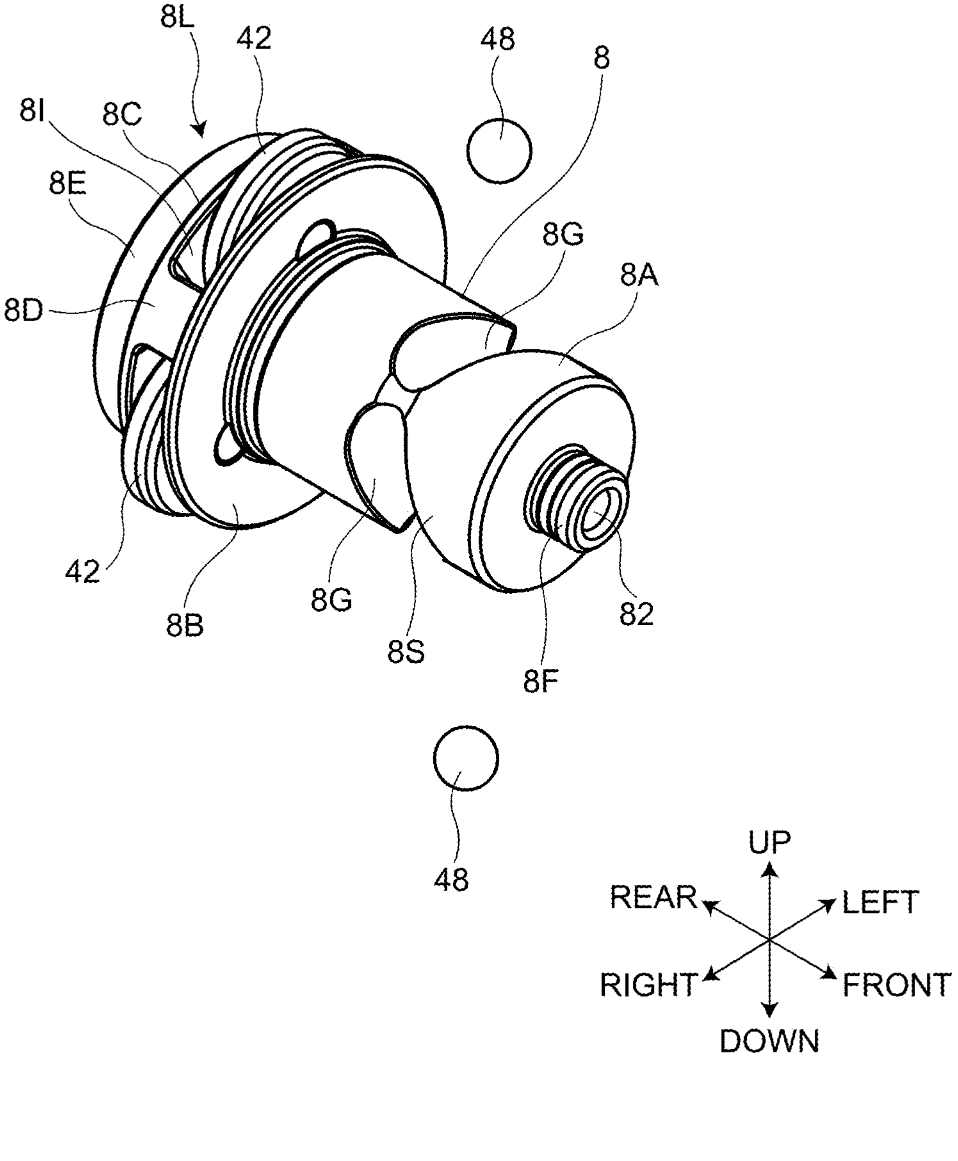
FIG. 5 is an exploded, oblique view showing a spindle and associated parts of of the impact tool according to the embodiment.

2 is a side view that shows an upper portion of the impact tool 1 according to the embodiment. FIG. 3 is a longitudinal, cross-sectional view that shows the upper portion of the impact tool 1 according to the embodiment. FIG. 4 is a transverse, cross-sectional view showing the upper portion of the impact tool 1 according to the embodiment. FIG. 5 is a right-side view showing a spindle and associated parts of the impact tool 1 according to the embodiment.

In the embodiment, the impact tool 1 is explained as an example of an impact tool according to the present teachings. In the embodiment, the impact tool 1 is an impact driver, which is one type of screw-tightening tool according to the present teachings. The impact tool 1 comprises a housing 2, a rear cover 3, a hammer case 4, a bearing box 24, a hammer-case cover 51, a bumper 52, a motor 6, a speed-reducing mechanism 7, a spindle 8, an impact mechanism 9, an anvil 10, a tool-holding mechanism 11, a fan 12, a battery-mounting part 13, a trigger lever 14, a forward/reverse-change lever 15, an interface panel 16, a quick mode-switching button 17, and a light assembly 18.

The housing 2 is made of a synthetic resin (polymer). In the embodiment, the housing 2 is made of nylon (polyamide). The housing 2 comprises a left housing 2L and a right housing 2R, which is disposed rightward of the left housing 2L. The left housing 2L and the right housing 2R are fixed to each other by a plurality of screws 2S. Thus, the housing 2 is constituted from a pair of half housings.

The housing 2 comprises a motor-housing part 21, a grip part 22, and a battery-holding part 23.

The motor-housing part 21 houses the motor 6. The motor-housing part 21 houses at least a portion of the hammer case 4. The motor-housing part 21 has a tube shape.

The grip part 22 is gripped by the user. The grip part 22 extends downward from the motor-housing part 21. The trigger lever 14 is provided at an upper portion of the grip part 22.

The battery-holding part 23 holds a battery pack 25 via the battery-mounting part 13. The battery-holding part 23 is connected to a lower-end portion of the grip part 22. In both the front-rear direction and the left-right direction, the dimensions of the outer shape of the battery-holding part 23 are larger than the dimensions of the outer shape of the grip part 22.

The rear cover 3 is disposed to cover an opening in a rear-end portion of the motor-housing part 21. The rear cover 3 is disposed rearward of the motor-housing part 21. The rear cover 3 houses at least a portion of the fan 12. The fan 12 is disposed in the interior of the rear cover 3. The rear cover 3 holds a rear-side rotor bearing 37. The rear cover 3 is made of a synthetic resin (polymer), such as nylon. The rear cover 3 is fixed to the rear-end portion of the motor-housing part 21 by two screws 3S.

The motor-housing part 21 has air-intake ports 19. The rear cover 3 has air-exhaust ports 20. Air outside of the housing 2 flows into the interior space of the housing 2 via the air-intake ports 19. Air in the interior space of the housing 2 flows out to the exterior of the housing 2 via the air-exhaust ports 20.

The hammer case 4 houses at least a portion of the speed-reducing mechanism 7 and houses the spindle 8, the impact mechanism 9, and at least a portion of the anvil 10. The hammer case 4 is made of a metal. In the embodiment, the hammer case 4 is made of aluminum. The hammer case 4 has a tube shape. The hammer case 4 is connected to a front portion of the motor-housing part 21. The bearing box 24 is fixed to a rear portion of the hammer case 4. The bearing box 24 (in particular, a forward portion 24B thereof) houses (holds) at least a portion of the speed-reducing mechanism 7. The bearing box 24 holds a front-side rotor bearing 38 and a spindle bearing 44. The bearing box 24 is made of a metal. The bearing box 24 is fixed to the rear portion of the hammer case 4. An intermediate portion 24C of the bearing box 24 extends between a base of the bearing box 24 and the forward portion 24B thereof.

The hammer case 4 is sandwiched between the left housing 2L and the right housing 2R. The rear portion of the hammer case 4 is housed in the motor-housing part 21. The hammer case 4 is connected to a front portion of the motor-housing part 21. The bearing box 24 is fixed to both the motor-housing part 21 and the hammer case 4.

The hammer-case cover 51 protects the hammer case 4. The hammer-case cover 51 blocks contact between the hammer case 4 and objects around the hammer case 4. The hammer-case cover 51 is disposed to cover the outer circumferential surface of a large-tube portion 4A.

The bumper 52 protects the hammer case 4. The bumper 52 blocks contact between the hammer case 4 and objects around the hammer case 4. The bumper 52 mitigates the impact when there is contact with an object. The bumper 52 is disposed around a small-tube portion 4B.

The motor 6 is the motive power supply of the impact tool 1. The motor 6 is an inner-rotor-type brushless motor. The motor 6 comprises a stator 26 and a rotor 27. The stator 26 is supported by the motor-housing part 21. At least a portion of the rotor 27 is disposed in the interior of the stator 26. The rotor 27 rotates relative to the stator 26. The rotor 27 rotates about rotational axis AX, which extends in the front-rear direction.

The stator 26 comprises a stator core 28, a rear-side insulator 29, a front-side insulator 30, and coils 31.

The stator core 28 comprises (is composed of) a plurality of laminated steel sheets. Each of the steel sheets is a sheet made of a metal in which iron is the main component. The stator core 28 has a tube shape. The stator core 28 is disposed more radially outward than the rotor 27. The stator core 28 comprises teeth that respectively support the coils 31.

The rear-side insulator 29 and the front-side insulator 30 are each an electrically insulating member that is made of a synthetic resin (polymer). The rear-side insulator 29 and the front-side insulator 30 each electrically insulates the stator core 28 and the coils 31 from each other. The rear-side insulator 29 is fixed to a rear portion of the stator core 28. The front-side insulator 30 is fixed to a front portion of the stator core 28. The rear-side insulator 29 is disposed so as to cover a forward portion of the surface of each of the teeth. The front-side insulator 30 is disposed so as to cover a rearward portion of the surface of each of the teeth.

The coils 31 are mounted (wound) on the stator core 28 via (over) the rear-side insulator 29 and the front-side insulator 30. A plurality of the coils 31 is provided. The coils 31 are respectively disposed around the teeth of the stator core 28 via (over) the rear-side insulator 29 and the front-side insulator 30. The coils 31 and the stator core 28 are electrically insulated from each other by the front-side insulator 30 and the rear-side insulator 29. The coils 31 are electrically connected to a source of power (e.g., the battery pack) via fusing terminals 36.

The rotor 27 rotates about rotational axis AX. The rotor 27 comprises a rotor core 32, a rotor shaft 33, at least one rotor magnet 34A, and at least one sensor magnet 34B.

The rotor core 32 and the rotor shaft 33 are each made of steel. In the embodiment, the rotor core 32 and the rotor shaft 33 are a single body. A rear portion of the rotor shaft 33 protrudes rearward from a rear-end surface of the rotor core 32. A front portion of the rotor shaft 33 protrudes forward from a front-end surface of the rotor core 32.

The rotor magnet 34A is fixed to the rotor core 32. In the embodiment, the rotor magnet 34A is disposed around the rotor core 32. The sensor magnet 34B is fixed to the rotor core 32. In the embodiment, the sensor magnet 34B is disposed on the front-end surface of the rotor core 32.

A sensor board 35 is mounted on the front-side insulator 30. The sensor board 35 is fixed to the front-side insulator 30 by a screw 30S. The sensor board 35 comprises a circuit board, which has a circular-ring shape, and at least one rotation-detection device, which is supported on the circuit board. At least a portion of the sensor board 35 opposes a front-end surface of the sensor magnet 34B. The rotation-detection device detects the location of the rotor 27 in the rotational direction by detecting the location of the sensor magnet 34B.

A rear-end portion of the rotor shaft 33 is supported by the rear-side rotor bearing 37 in a rotatable manner. A front-end portion of the rotor shaft 33 is supported by the front-side rotor bearing 38 in a rotatable manner. The rear-side rotor bearing 37 is held by the rear cover 3. The front-side rotor bearing 38 is held by the bearing box 24.

The front-end portion of the rotor shaft 33 is disposed in an interior space of the hammer case 4 via an opening that is provided in a rear-side, ring-shaped portion 24A of the bearing box 24.

A pinion gear (sun gear) 41 is formed at the front-end portion of the rotor shaft 33. The pinion gear 41 is coupled to an input portion of the speed-reducing mechanism 7. More specifically, the rotor shaft 33 is coupled to the speed-reducing mechanism 7 via the pinion gear 41.

The speed-reducing mechanism 7 couples the rotor shaft 33 and the spindle 8 to each other. Gears of the speed-reducing mechanism 7 are driven by the rotor 27. The speed-reducing mechanism 7 transmits the rotation of the rotor 27 to the spindle 8. The speed-reducing mechanism 7 causes the spindle 8 to rotate at a rotational speed that is lower than the rotational speed of the rotor shaft 33, but at an increased torque. The speed-reducing mechanism 7 is disposed more forward than the stator 26. The speed-reducing mechanism 7 comprises a planetary-gear mechanism.

The planetary-gear mechanism of the speed-reducing mechanism 7 comprises a plurality of planet gears 42, which is disposed around the pinion gear 41, and an internal gear 43, which is disposed around the plurality of planet gears 42. The pinion gear 41, the planet gears 42, and the internal gear 43 are each housed in the hammer case 4. Each of the planet gears 42 meshes with the pinion gear 41. The planet gears 42 are respectively supported in a rotatable manner by the spindle 8 via pins 42P. The spindle 8 is rotated by the planet gears 42. The internal gear 43 has inner teeth, which mesh with the planet gears 42.

The internal gear 43 is fixed to the large-tube portion 4A of the hammer case 4. The internal gear 43 is always non-rotatable relative to the hammer case 4.

When the rotor shaft 33 rotates owing to the driving of the motor 6, the pinion gear 41 rotates, and the planet gears 42 revolve around the pinion gear 41. The planet gears 42 revolve while meshing with the inner teeth of the internal gear 43. Owing to the revolving of the planet gears 42, the spindle 8, which is connected to the planet gears 42 via the pins 42P, rotates at a rotational speed that is lower than the rotational speed of the rotor shaft 33.

Figure 6:
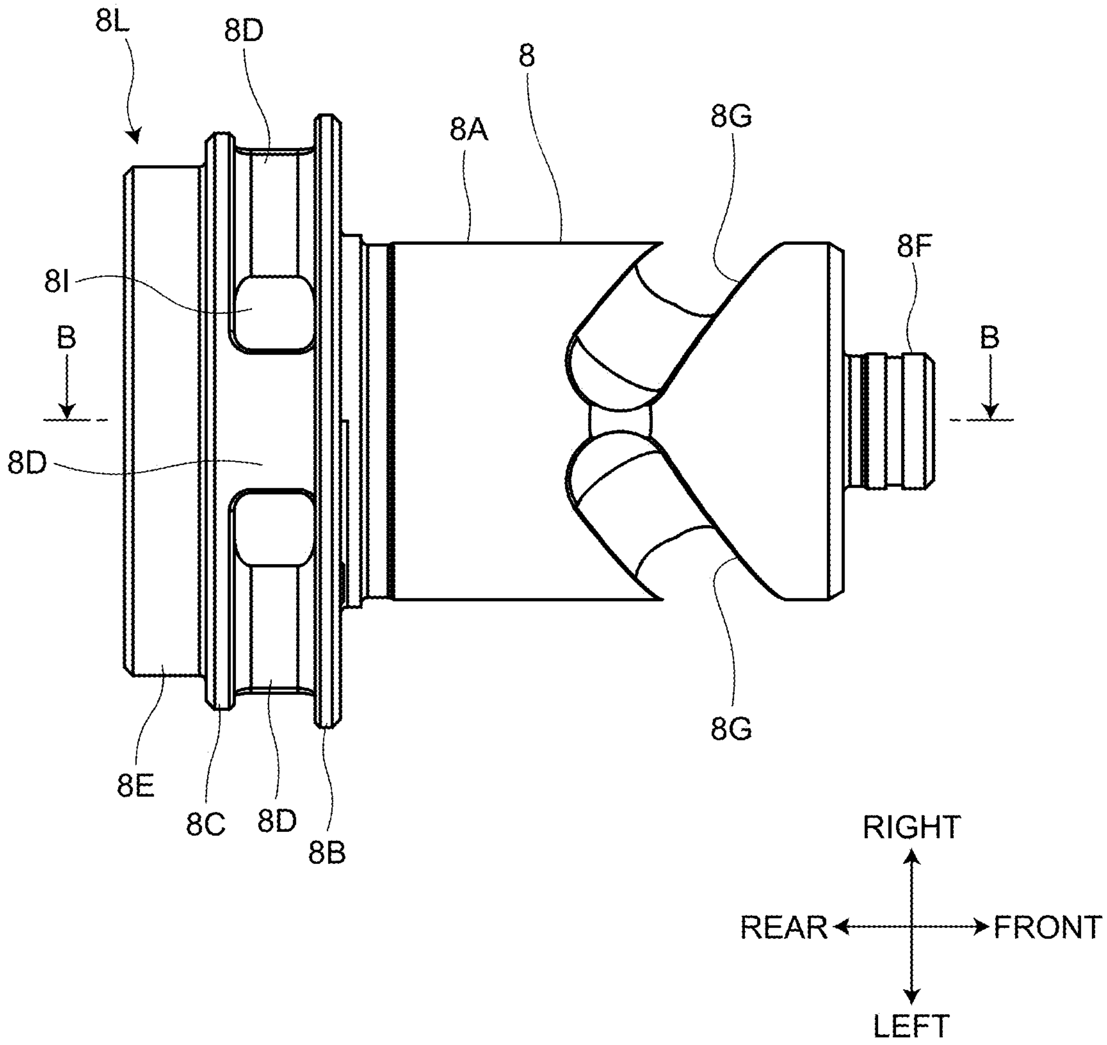
FIG. 6 is a bottom view showing a spindle according to the embodiment.
Figure 7A:
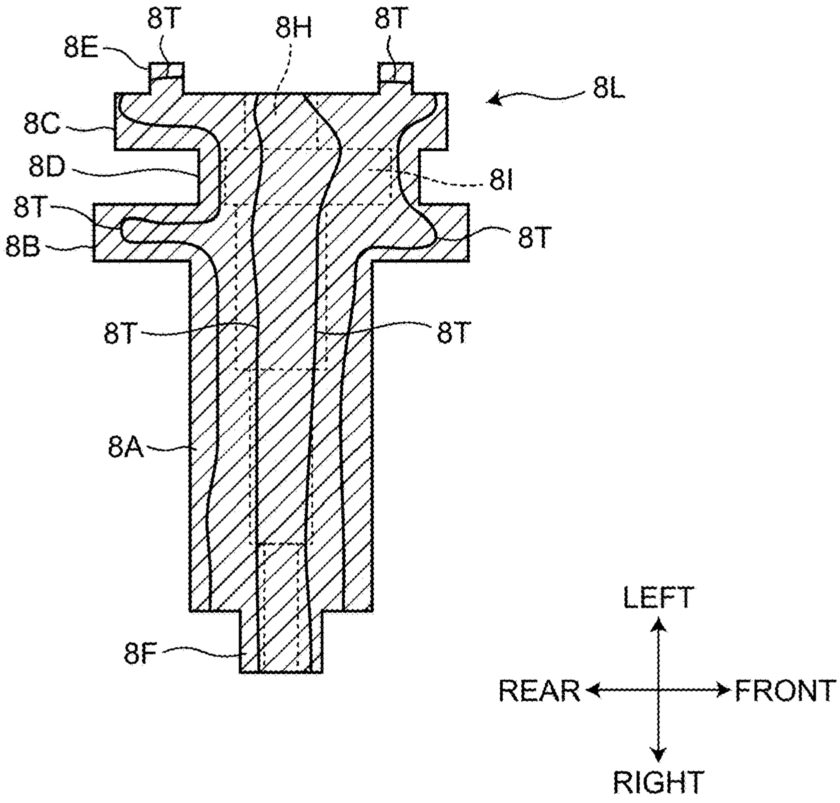
FIG. 7A schematically shows one example of grain flows in a solid portion of the spindle according to a first forging variation of the embodiment.
Figure 7B:
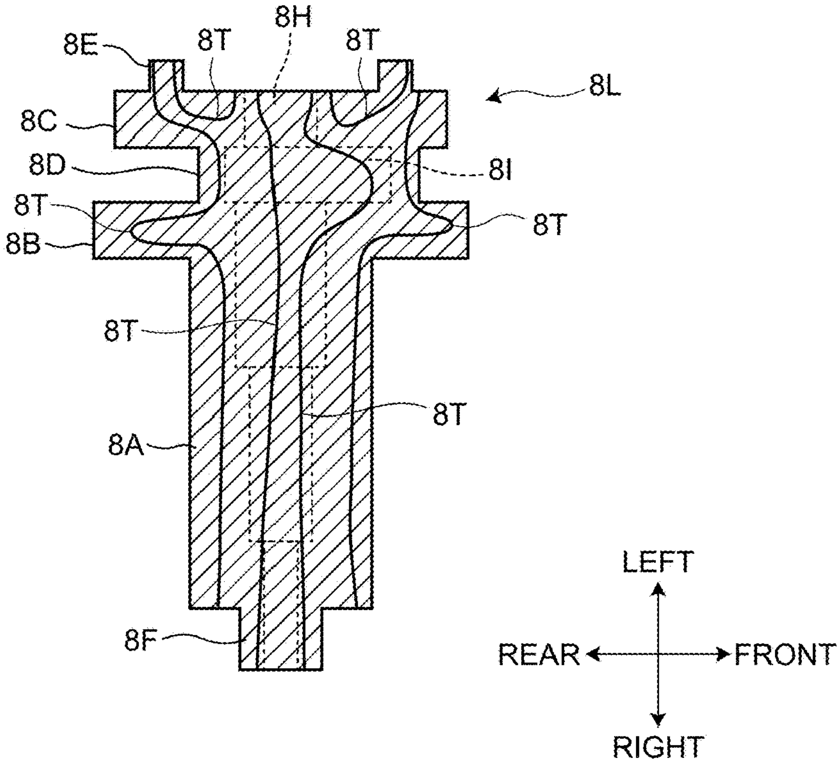
FIG. 7B schematically shows another example of grain flows in the solid portion of the spindle according to a second forging variation of the embodiment.
Figure 8:
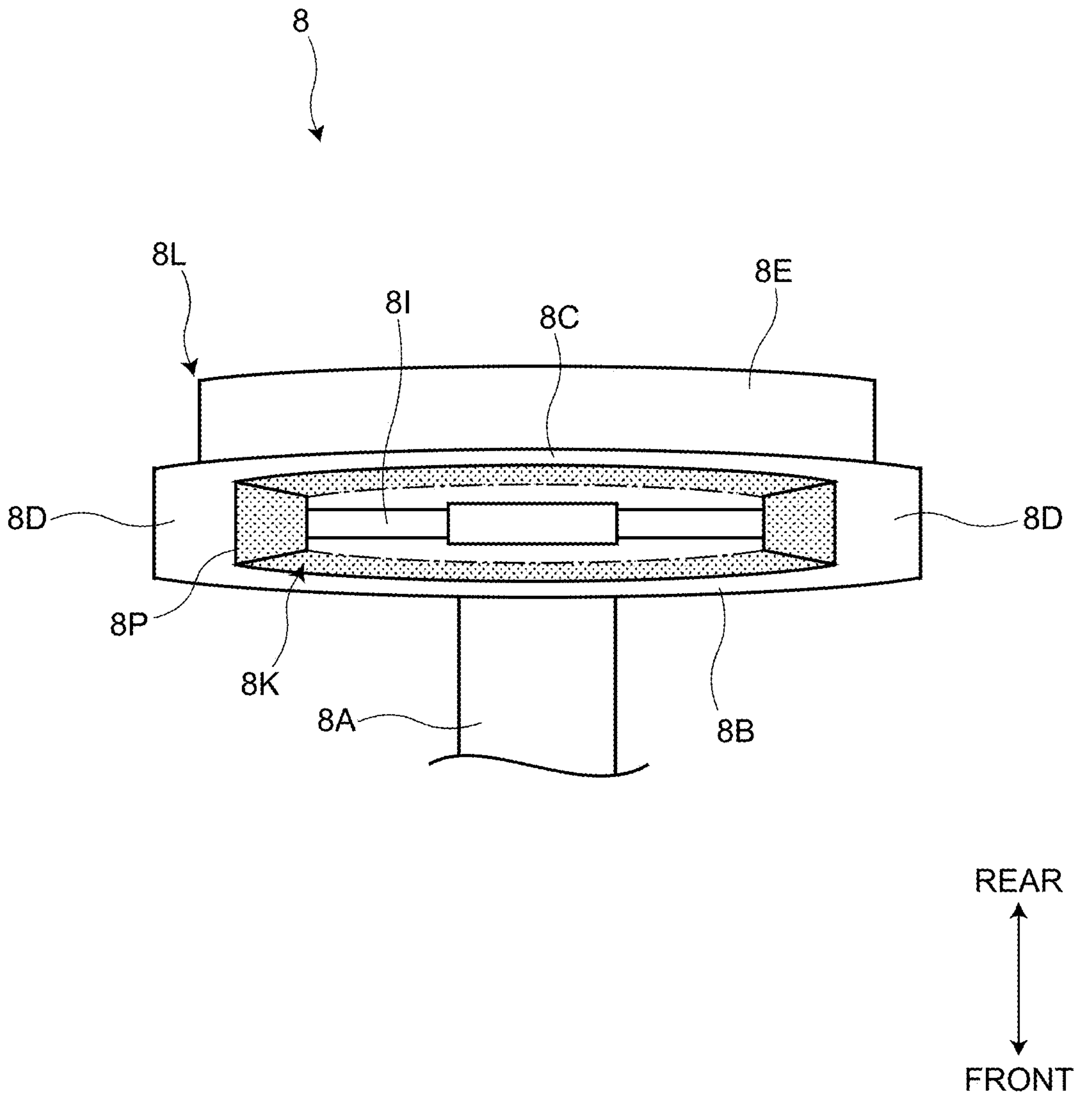
FIG. 8 is a side view of the spindle according to the embodiment.

FIG. 5 is an exploded, oblique view showing the spindle 8 and associated parts of the impact tool 1 according to the embodiment. FIG. 6 is a bottom view showing the spindle 8 according to the embodiment. FIG. 7A and FIG. 7B each schematically shows the grain flows in the solid portion of the spindle 8 according to two different variants of the embodiment. FIG. 8 is a side view of the spindle 8 according to the embodiment.

The spindle 8 rotates about rotational axis AX in response to energization of the motor 6. More specifically, the spindle 8 is rotated by the rotational force of the rotor 27 transmitted thereto via the speed-reducing mechanism 7. The spindle 8 transmits the rotational force of the motor 6 to the anvil 10 via balls 48 and a hammer 47. At least a portion of the spindle 8 is disposed more forward than the motor 6. The spindle 8 is disposed more forward than the stator 26. At least a portion of the spindle 8 is disposed more forward than the rotor 27. At least a portion of the spindle 8 is disposed more forward than the speed-reducing mechanism 7. At least a portion of the spindle 8 is disposed more rearward than the anvil 10.

The spindle 8 comprises a spindle-shaft portion 8A and a flange portion 8L.

The spindle-shaft portion 8A has a rod shape that is elongated in the front-rear direction. The central axis of the spindle-shaft portion 8A and rotational axis AX coincide (are colinear) with each other. The spindle-shaft portion 8A has a spindle-protrusion portion 8F. The spindle-protrusion portion 8F protrudes forward from a front-end portion of the spindle-shaft portion 8A.

The flange portion 8L includes a first flange portion 8B, a second flange portion 8C, and coupling portions 8D. The first flange portion 8B extends radially outward from an outer circumferential surface of the spindle-shaft portion 8A at a rear-end portion thereof. The second flange portion 8C is disposed more rearward than the first flange portion 8B. The second flange portion 8C has a ring shape. The second flange portion 8C has an insertion hole 8H in the axial direction for insertion of the pinion gear 41. The insertion hole 8H is disposed in the second flange portion 8C at the center thereof in the up-down direction and the left-right direction.

Slit (slot) portions 81 are formed between the first flange portion 8B and the second flange portion 8C. The slit portions 81 are spaces for mounting the planet gears 42 therein, as can be seen in FIG. 5. At least some of the slit portions 81 are opened in (at, along) a side surface of the flange portion 8L.

The coupling portions 8D couple portions of the first flange portion 8B and portions of the second flange portion 8C to each other. The coupling portions 8D are each disposed at a side surface of the flange portion 8L. In the present embodiment, the coupling portions 8D are disposed equispaced in (around) the circumferential direction. The coupling portions 8D partition the slit portions 81 at circumferential-edge portions of the first flange portion 8B and the second flange portion 8C. The front-end portions of the pins 42P are supported by the first flange portion 8B. The rear-end portions of the pins 42P are supported by the second flange portion 8C. Portions of the planet gears 42 are disposed between the first flange portion 8B and the second flange portion 8C, as can be seen in FIG. 5. The planet gears 42 are respectively supported in a rotatable manner by the first flange portion 8B and the second flange portion 8C via the pins 42P. Each of the planet gears 42 is disposed respectively between mutually adjacent coupling portions 8D in the circumferential direction at a location sandwiched between the first flange portion 8B and the second flange portion 8C.

The spindle bearing 44 (see FIG. 4, etc.) is disposed in the interior of a cylindrical-shaped portion 8E of the spindle 8; the cylindrical-shaped portion 8E protrudes rearward from a rear surface of the second flange portion 8C. The spindle bearing 44 rotatably supports the cylindrical-shaped portion 8E of the spindle 8. The spindle bearing 44 is held in the bearing box 24.

In the present embodiment, at least a portion of the flange portion 8L of the spindle 8 is formed (shaped) by forging. As shown in FIG. 7A and FIG. 7B, viewed in a cross section, grain flows 8T in the spindle 8 are formed by forging. FIG. 7A shows the grain flows in an embodiment in which forging was performed by an upsetting method, and FIG. 7B shows the grain flows in an embodiment in which forging was performed by a backward-extrusion method, which are described below. As shown in FIG. 7A and FIG. 7B, the grain flows 8T are formed, going outward from the center of the radial direction, in the first flange portion 8B, in the second flange portion 8C, and in the cylindrical-shaped portion 8E of the flange portion 8L. It is noted that, in the example shown in FIG. 7A, the grain flows 8T are formed along the radial direction in the cylindrical-shaped portion 8E. Furthermore, in FIG. 7A, the grain flows 8T formed in the cylindrical-shaped portion 8E are formed such that they are separated (disconnected) from other portions such as the second flange portion 8C as will be further explained below. On the other hand, in the example shown in FIG. 7B, the grain flows 8T are formed such that they are continuous from the cylindrical-shaped portion 8E to the second flange portion 8C. Thus, the shapes of the grain flows 8T formed in the flange portion 8L differ between an embodiment in which forging is performed by the upsetting method and an embodiment in which forging is performed by the backward-extrusion method.

Portions of the spindle 8 that face openings 8P surrounded (defined) by the first flange portion 8B, the second flange portion 8C, and the plurality of coupling portions 8D are non-cut portions 8K. The non-cut portions 8K are portions at which no cutting is performed with respect to surfaces that are formed by forging. Cutting is performed on portions other than the non-cut portions 8K of the spindle 8. Thus, because the openings of the slit portions 8I can be configured (formed) by the non-cut portions 8K, respectively, cutting need not be performed to form those openings 8P.

The spindle 8 is formed using a steel that contains 0.13% or more and 1.00% or less of carbon and 0.90% or more of chromium. It is noted that the spindle 8 may be formed using a steel that contains at least carbon, chromium, and molybdenum. Owing to such a composition of the spindle 8 (slug 70), it is possible to plastically deform the spindle sufficiently by forging, and moreover it is possible to ensure sufficient post-deformation strength thereof due to the strain hardening that results from cold working the spindle 8 to form the second flange portion 8C. Preferably, the first flange portion 8B is formed by forging a blank to form the slug 70, thereby achieving strain hardening in the first flange portion 8B prior to forging the second flange portion 8C.

The impact mechanism 9 is driven by the motor 6. The rotational force of the motor 6 is transmitted to the impact mechanism 9 via the speed-reducing mechanism 7 and the spindle 8. The impact mechanism 9 impacts the anvil 10 in a rotational direction using the rotational force of the spindle 8, which is rotated by the motor 6. The impact mechanism 9 comprises the hammer 47, the balls 48, a coil spring 49, and a washer 50. The impact mechanism 9, which comprises the hammer 47, the balls 48, the coil spring 49, and the washer 50, is housed in the large-tube portion 4A of the hammer case 4.

The hammer 47 is disposed more forward than the speed-reducing mechanism 7. The hammer 47 is disposed around the spindle 8. The hammer 47 is disposed around the spindle-shaft portion 8A. The hammer 47 is held on the spindle-shaft portion 8A. The balls 48 are disposed between the spindle 8 and the hammer 47.

The hammer 47 is rotated using the rotational energy output by the motor 6 as will be further explained below. The rotational force of the motor 6 is transmitted to the hammer 47 via the speed-reducing mechanism 7 and the spindle 8. The hammer 47 is rotatable, together with the spindle 8, using the rotational force of the spindle 8, which is rotated by the motor 6. The rotational axis of the hammer 47, the rotational axis of the spindle 8, and rotational axis AX of the motor 6 coincide with each other. The hammer 47 rotates about rotational axis AX.

The washer 50 is disposed in the interior of a recessed portion 47E, which is defined in part by a radially-outer, annular portion 47B of the hammer 47. The washer 50 is supported on the hammer 47 via a plurality of balls 54. The balls 54 are disposed more forward than the washer 50. The balls 54 are disposed between a rear surface of a body portion 47A and a front surface of the washer 50.

The coil spring 49 is disposed around the spindle-shaft portion 8A. A rear-end portion of the coil spring 49 is supported by (contacts) the first flange portion 8B. A front-end portion of the coil spring 49 is disposed in the interior of the recessed portion 47E and supported by (contacts) the washer 50. The coil spring 49 continuously generates an elastic force, which urges the hammer 47 to move forward.

The balls 48 are made of a metal such as steel. The balls 48 are disposed between the spindle-shaft portion 8A and the body portion 47A. The spindle-shaft portion 8A has spindle grooves 8G, in each of which at least a portion of the corresponding ball 48 is disposed. The spindle grooves 8G are provided in portions of the outer circumferential surface of the spindle-shaft portion 8A. The hammer 47 has hammer grooves 47G, in each of which at least a portion of the corresponding ball 48 is disposed. Each of the hammer grooves 47G is provided in a portion of the body portion 47A and a portion of an inner circumferential surface of an inner-tube portion 47C.

Two of the balls 48 are provided. Two of the spindle grooves 8G are provided in the outer circumferential surface of the spindle-shaft portion 8A. Two of the hammer grooves 47G are provided in the body portion 47A and the inner circumferential surface of the inner-tube portion 47C. One of the balls 48 is disposed between one of the spindle grooves 8G and one of the hammer grooves 47G. The other of the balls 48 is disposed between the other of the spindle grooves 8G and the other of the hammer grooves 47G. Each of the balls 48 can roll along the inner side of the corresponding spindle groove 8G and the inner side of the corresponding hammer groove 47G, respectively. The hammer 47 is movable as the balls 48 move. The spindle 8 and the hammer 47 can move relative to each other in both the axial direction and the rotational direction within a movable range defined by the spindle grooves 8G and the hammer grooves 47G.

The anvil 10 is disposed more forward than the motor 6. The anvil 10 is an output part of the impact tool 1, which is rotated by the rotational force of the rotor 27. At least a portion of the anvil 10 is disposed more forward than the spindle 8. At least a portion of the anvil 10 is disposed more forward than the hammer 47. The anvil 10 is impacted in the rotational direction by the hammer 47.

The anvil 10 has an anvil-shaft portion 10A and anvil-projection portions 10B. The anvil-shaft portion 10A has a rod shape that is elongated in the front-rear direction. The central axis of the anvil-shaft portion 10A and rotational axis AX coincide (are colinear) with each other. The anvil-projection portions 10B are provided at rear-end portions of the anvil-shaft portion 10A. The anvil-projection portions 10B project radially outward from the rear-end portions of the anvil-shaft portion 10A. Two of the anvil-projection portions 10B are provided.

A tool hole 10C is provided in a front-end surface of the anvil 10. An anvil recessed portion 10D is provided in a rear-end surface of the anvil 10. The tool hole 10C is formed so as to extend rearward from the front-end surface of the anvil-shaft portion 10A. A tool accessory (e.g., a screwdriver bit) is inserted into the tool hole 10C. Thus, the tool accessory is mounted on (in) the anvil 10. The anvil recessed portion 10D is provided recessed forward from the rear-end surface of the anvil 10. The spindle-protrusion portion 8F is disposed in the anvil recessed portion 10D.

The anvil 10 is supported in a rotatable manner by anvil bearings 46. The rotational axis of the anvil 10, the rotational axis of the hammer 47, the rotational axis of the spindle 8, and rotational axis AX of the motor 6 coincide (are colinear) with each other. The anvil 10 rotates about rotational axis AX. The anvil bearings 46 are disposed around the anvil-shaft portion 10A. O-rings 45 are disposed between the anvil bearings 46 and the anvil-shaft portion 10A. The anvil bearings 46 are disposed in the interior of the small-tube portion 4B of the hammer case 4. The anvil bearings 46 are held in the small-tube portion 4B of the hammer case 4, which is connected to the large-tube portion 4A of the hammer case 4 by an intermediate portion 4C. The hammer case 4 supports the anvil 10 via the anvil bearings 46. The anvil bearings 46 support a front portion of the anvil-shaft portion 10A in a rotatable manner. In the embodiment, two of the anvil bearings 46 are arranged in the front-rear direction.

A washer 56 is disposed forward of the anvil-projection portions 10B. The washer 56 blocks contact between the front surfaces of the anvil-projection portions 10B and the hammer case 4. A support member 57 is disposed rearward of the anvil bearings 46. The support member 57 is disposed so as to make contact with a rear surface of an outer ring of one of the anvil bearings 46. The support member 57 has a ring shape. The support member 57 restrains (blocks) the anvil bearings 46 from coming off of the small-tube portion 4B rearward. The support member 57 is disposed in a groove provided in an inner circumferential surface of the small-tube portion 4B.

Hammer-projection portions 47D are capable of contacting the anvil-projection portions 10B. In the state in which the hammer-projection portions 47D and the anvil-projection portions 10B are in continuous contact with each other, the anvil 10 rotates together with the hammer 47 and the spindle 8 owing to the drive of the motor 6.

The anvil 10 can also be impacted in the rotational direction by the hammer 47. For example, during screw-tightening work, when the load acting on the anvil 10 becomes high, the anvil 10 can no longer be caused to rotate by merely the load of the coil spring 49. When the anvil 10 can no longer be caused to rotate by merely the load of the coil spring 49, the rotation of the anvil 10 and the hammer 47 will momentarily stop. At this time, the spindle 8 and the hammer 47 can move relative to each other in the axial direction and the circumferential direction via the balls 48. Even though the rotation of the hammer 47 momentarily stops, the rotation of the spindle 8 continues owing to the motive power generated by the motor 6. In the state in which the rotation of the hammer 47 has momentarily stopped and the spindle 8 continues to rotate, the balls 48 move rearward while being guided by the spindle grooves 8G and the hammer grooves 47G, respectively. In the state in which the rotation of the hammer 47 has momentarily stopped the spindle 8 continues rotates, an outer circumferential surface 8S of the spindle 8 and an inner circumferential surface 47S of the hammer 47 slide relative to each other. The hammer 47 receives a force from the balls 48 and moves rearward as the balls 48 move. That is, while the anvil 10 is momentarily stopped, the hammer 47 moves rearward owing to the rotation of the spindle 8. Owing to the rearward movement of the hammer 47, contact between the hammer-projection portions 47D and the anvil-projection portions 10B is released.

As described above, the coil spring 49 continuously generates an elastic force, which urges the hammer 47 to move forward. After having moved rearward, the hammer 47 moves forward owing to the elastic force of the coil spring 49. When the hammer 47 moves forward, it receives a force in the rotational direction from the balls 48. That is, the hammer 47 moves forward while rotating. When the hammer 47 moves forward while rotating, the hammer-projection portions 47D respectively contact the anvil-projection portions 10B while rotating. Thereby, the anvil-projection portions 10B are impacted in the rotational direction by the hammer-projection portions 47D of the hammer 47. The motive power of the motor 6 and the inertial force of the hammer 47 both act on the anvil 10. Accordingly, the anvil 10 can be rotated about rotational axis AX with a higher torque.

The tool-holding mechanism 11 is disposed around a front portion of the anvil 10. The tool-holding mechanism 11 holds a tool accessory that is inserted into the tool hole 10C of the anvil 10. The tool accessory is detachable from the tool-holding mechanism 11.

The fan 12 is disposed more rearward than the stator 26 of the motor 6. The fan 12 generates an airflow for cooling the motor 6. The fan 12 is fixed to at least a portion of the rotor 27. The fan 12 is fixed to a rear portion of the rotor shaft 33 via a bushing 12A. The fan 12 is disposed between the rear-side rotor bearing 37 and the stator 26. The fan 12 rotates owing to the rotation of the rotor 27. Owing to the rotation of the rotor shaft 33, the fan 12 rotates together with the rotor shaft 33. Owing to the rotation of the fan 12, air in the exterior space of the housing 2 flows into the interior space of the housing 2 via the air-intake ports 19. Air that has flowed into the interior space of the housing 2 flows through the interior space of the housing 2 and thereby cools the motor 6. Owing to the rotation of the fan 12, air that has flowed through the interior space of the housing 2 flows out to the exterior space of the housing 2 via the air-exhaust ports 20.

The battery-mounting part 13 is disposed on a lower portion of the battery-holding part 23. The battery-mounting part 13 is connected to the battery pack 25. The battery pack 25 is mounted on the battery-mounting part 13. The battery pack 25 is detachable from the battery-mounting part 13. The battery pack 25 is mounted on the battery-mounting part 13 by being inserted into the battery-mounting part 13 from forward of the battery-holding part 23. The battery pack 25 is removed from the battery-mounting part 13 by being pulled forward from the battery-mounting part 13. The battery pack 25 comprises secondary batteries. In the embodiment, the battery pack 25 comprises rechargeable lithium-ion batteries. By being mounted on the battery-mounting part 13, the battery pack 25 can supply electric power to the impact tool 1. The motor 6 is driven using the electric power supplied from the battery pack 25.

The trigger lever 14 is provided at the grip part 22. The trigger lever 14 is manipulated by the user to start the motor 6. The motor 6 is switched between being driven and being stopped by the manipulation of the trigger lever 14.

The forward/reverse-change lever 15 is provided at an upper portion of the grip part 22. The forward/reverse-change lever 15 is manipulated by the user. By manipulating the forward/reverse-change lever 15, the rotational direction of the motor 6 is switched from one of the forward-rotational direction and the reverse-rotational direction to the other. Switching the rotational direction of the motor 6 switches the rotational direction of the spindle 8.

The interface panel 16 is provided on the battery-holding part 23. The interface panel 16 is provided on an upper surface of the battery-holding part 23 more on the forward side than the grip part 22. The interface panel 16 comprises manipulatable buttons 16A. There may be one or a plurality of the manipulatable buttons 16A. A plurality of the manipulatable buttons 16A is provided in the embodiment. By manipulating (pressing) one of the manipulatable buttons 16A, the user can switch (change, cycle) the action mode of the motor 6.

The quick mode-switching button 17 is provided at an upper portion of the trigger lever 14. The quick mode-switching button 17 is manipulated by the user. The action mode of the motor 6 is switched (changed, cycled) by pressing the quick mode-switching button 17.

The light assembly 18 emits illumination light. The light assembly 18 illuminates the anvil 10 and the periphery of the anvil 10 with the illumination light. The light assembly 18 illuminates forward of the anvil 10 with the illumination light. Additionally, the light assembly 18 illuminates the tool accessory that is mounted on the anvil 10 and the periphery of the tool accessory with the illumination light. In the embodiment, the light assembly 18 is disposed on the left side and on the right side of the large-tube portion 4A of the hammer case 4.

The spindle 8 has an interior space 60. An opening is provided in a rear-end surface of the spindle 8. The interior space 60 is formed in the interior of the spindle 8 so as to extend forward from the opening provided in the rear-end surface of the spindle 8. The interior space 60 houses lubricating oil. The lubricating oil includes grease. A front-end portion of the pinion gear 41 is inserted into a rear-end portion of the interior space 60 via the opening in the rear-end surface of the spindle 8.

Figure 9:
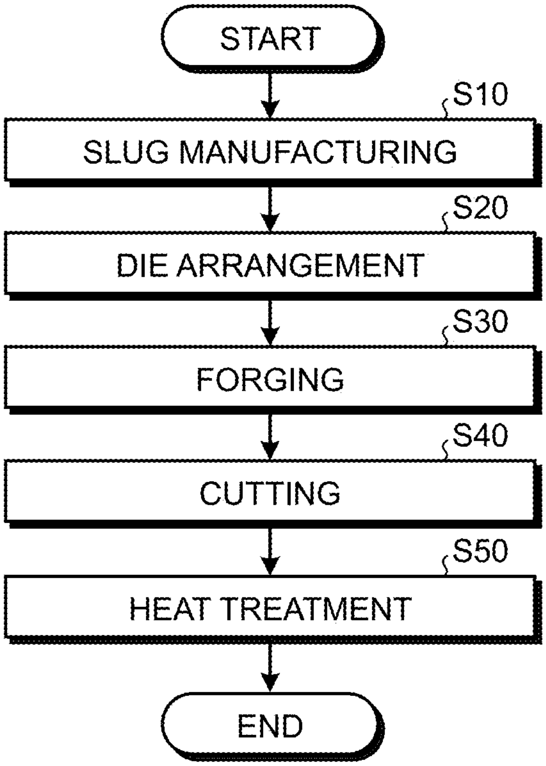
FIG. 9 is a flow chart showing one example of a method of manufacturing the spindle according to the embodiment.

FIG. 9 is a flow chart showing a representative, non-limiting example of a method of manufacturing the spindle 8 according to the embodiment. As shown in FIG. 9, the method of manufacturing the spindle 8 includes a slug-manufacturing step S10, a die-arranging step S20, a forging step S30, a cutting step S40, and a heat-treatment step S50.

A slug 70, which will be the precursor of the spindle 8, is formed in the slug-manufacturing step S10. The slug 70 can be formed using, for example, a forging technique, or the like. In this situation, the slug 70 can be formed at a temperature of: −20° C. or higher and 40° C. or lower (cold forging); 300° C. or higher and 850° C. or lower (warm forging); or 1,000° C. or higher and 1,250° C. or lower (hot forging). It is noted that the temperature of the slug 70 may be any temperature during the slug-manufacturing step S10, as long as the temperature is in the range of −20° C. or higher and 1,250° C. or lower. In particular, a first flange-corresponding portion 72B is formed when forging the slug 70.

Figure 10:
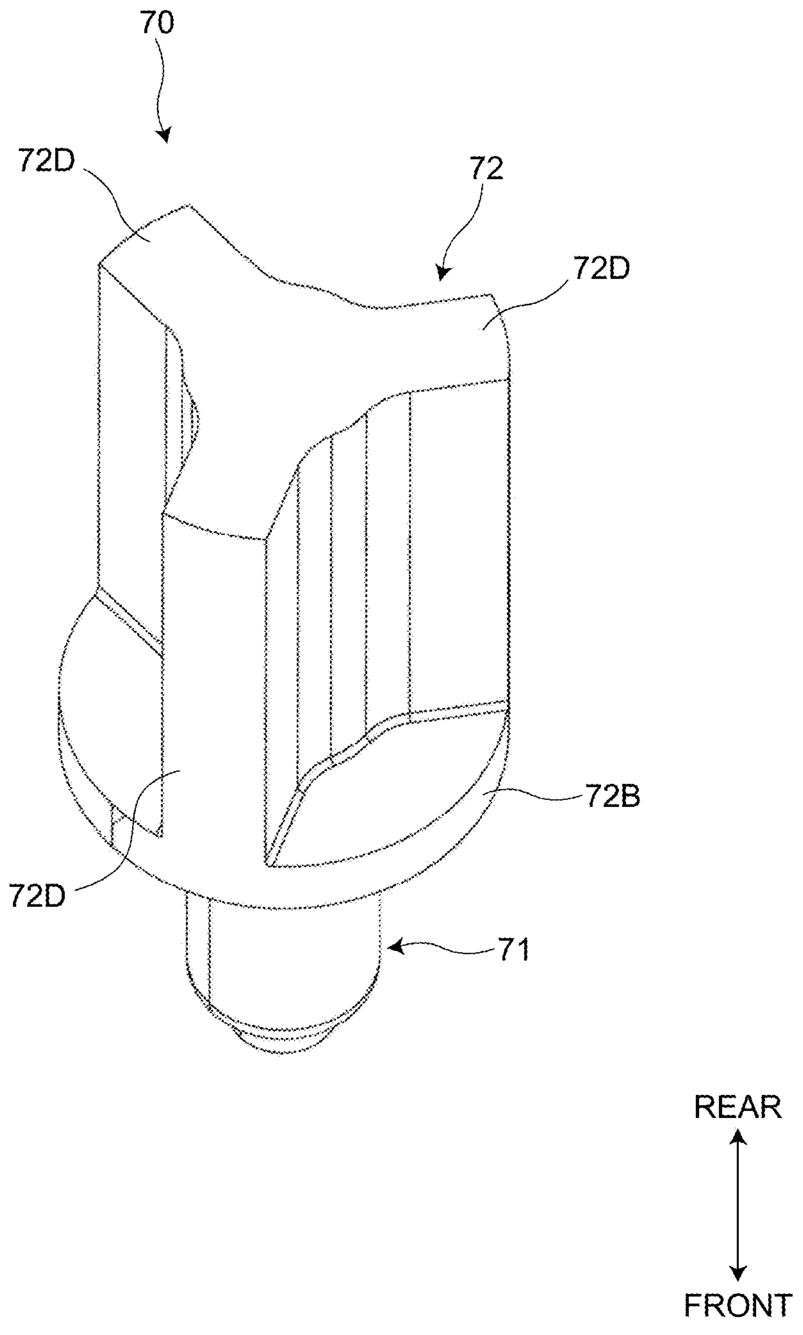
FIG. 10 shows one example of a slug (semi-finished product) according to the embodiment.

FIG. 10 shows one example of the slug 70 according to the embodiment. The slug 70 comprises a shaft-corresponding portion 71 and a flange-corresponding portion 72. The shaft-corresponding portion 71 is the portion that corresponds to the spindle-shaft portion 8A of the spindle 8.

The flange-corresponding portion 72 is the portion that corresponds to the flange portion 8L of the spindle 8. The flange-corresponding portion 72 includes the above-mentioned first flange-corresponding portion 72B, which corresponds to the first flange portion 8B of the spindle 8, and coupling-corresponding portions 72D, which correspond to the coupling portions 8D of the spindle 8. The first flange-corresponding portion 72B has a disk or ring shape. Each of the coupling-corresponding portions 72D has a shape in which a plate-shaped portion extends radially outward in three directions from the center in the axial direction. The coupling-corresponding portions 72D are disposed so that the angles formed with the adjacent coupling-corresponding portions 72D are equal (e.g., 120°). It is noted that the angles formed between the adjacent coupling-corresponding portions 72D among the plurality of coupling-corresponding portions 72D need not be equal.

Figure 11:
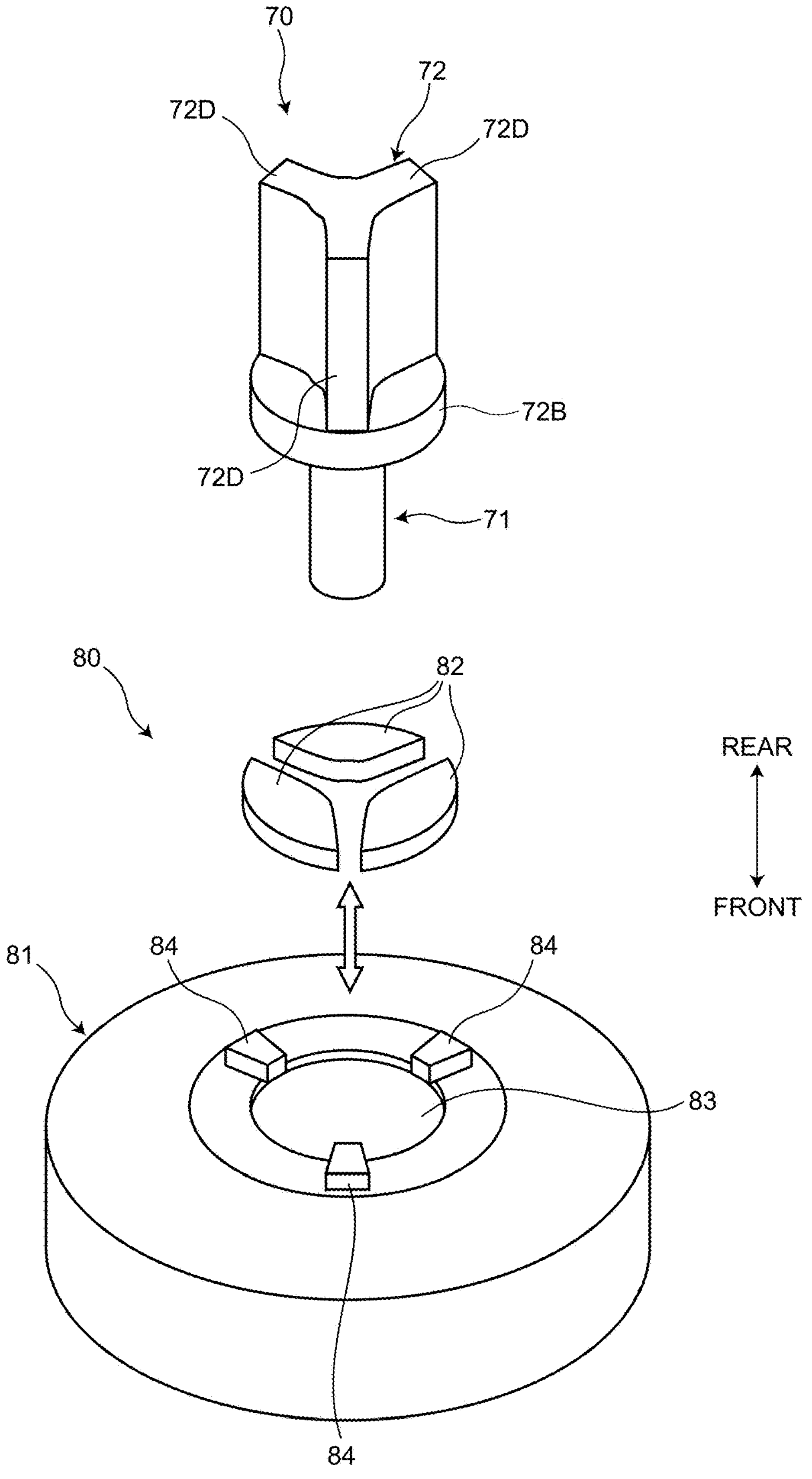
FIG. 11 shows one example of a forging die according to the embodiment.
Figure 12:
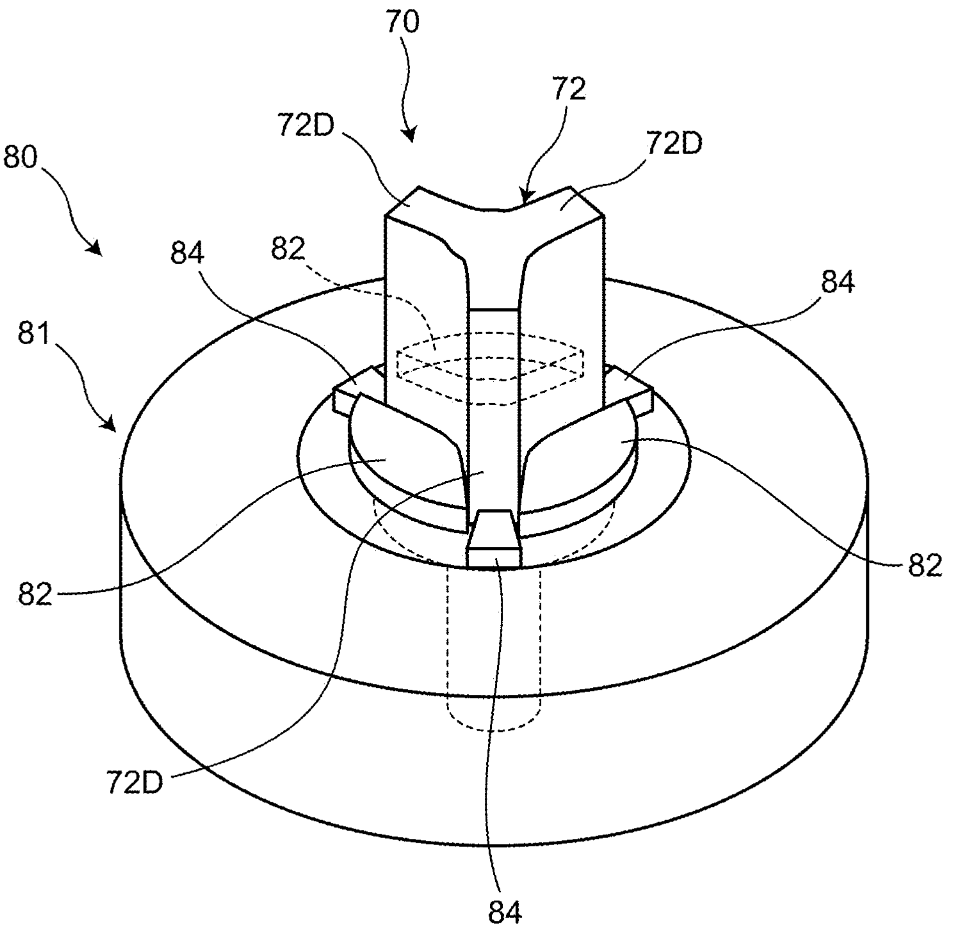
FIG. 12 shows one example of a die-arranging step according to the embodiment.
Figure 12:
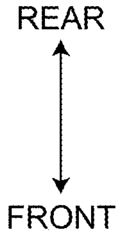

A forging die 80 is arranged with respect to the slug 70 in the die-arranging step S20. FIG. 11 shows one example of the forging die 80 according to the embodiment. FIG. 12 shows one example of the die-arranging step S20 according to the embodiment. As shown in FIG. 11, the forging die 80 comprises a slug-support part 81 and slit-corresponding parts 82. The slug-support part 81 supports the slug 70. The slug-support part 81 comprises a housing part 83 and tab parts 84.

The housing part 83 accommodates the shaft-corresponding portion 71 of the slug 70 and the first flange-corresponding portion 72B of the flange-corresponding portion 72. In the state in which the slug 70 is accommodated in the housing part 83, the tab parts 84 support outer circumferential side surfaces in the radial direction of the coupling-corresponding portions 72D of the slug 70. Three of the tab parts 84 are arranged at equal pitch (intervals) in the circumferential direction. In an embodiment in which the slug 70 is accommodated in the housing part 83, outer-side end portions of the three coupling-corresponding portions 72D of the slug 70 are disposed so as to oppose the tab parts 84. The tab parts 84 position the slit-corresponding parts 82.

The slit-corresponding parts 82 are parts corresponding to the slit portions 81 of the spindle 8. The slit-corresponding parts 82 are configured as, for example, a plurality of fan-like, plate-shaped members. Inner-peripheral portions of the slit-corresponding parts 82 have shapes corresponding to the coupling-corresponding portions 72D of the slug 70. As shown in FIG. 12, the slit-corresponding parts 82 are disposed in the circumferential direction between mutually adjacent tab parts 84 in the state in which the slug 70 is accommodated in the housing part 83. In other words, the slit-corresponding parts 82 are disposed so as to fill between mutually adjacent coupling-corresponding portions 72D in the circumferential direction of the slug 70.

In the forging step S30, after the forging die 80 has been arranged as described above, a rear-end portion 72E of the flange-corresponding portion 72 is struck in the axial direction to cause plastic deformation of the flange-corresponding portion 72 along the slit-corresponding parts 82 of the forging die 80. The forging step S30 can be performed with the temperature of the slug 70 at, for example, approximately 25° C. (cold forging).

Figure 13A:
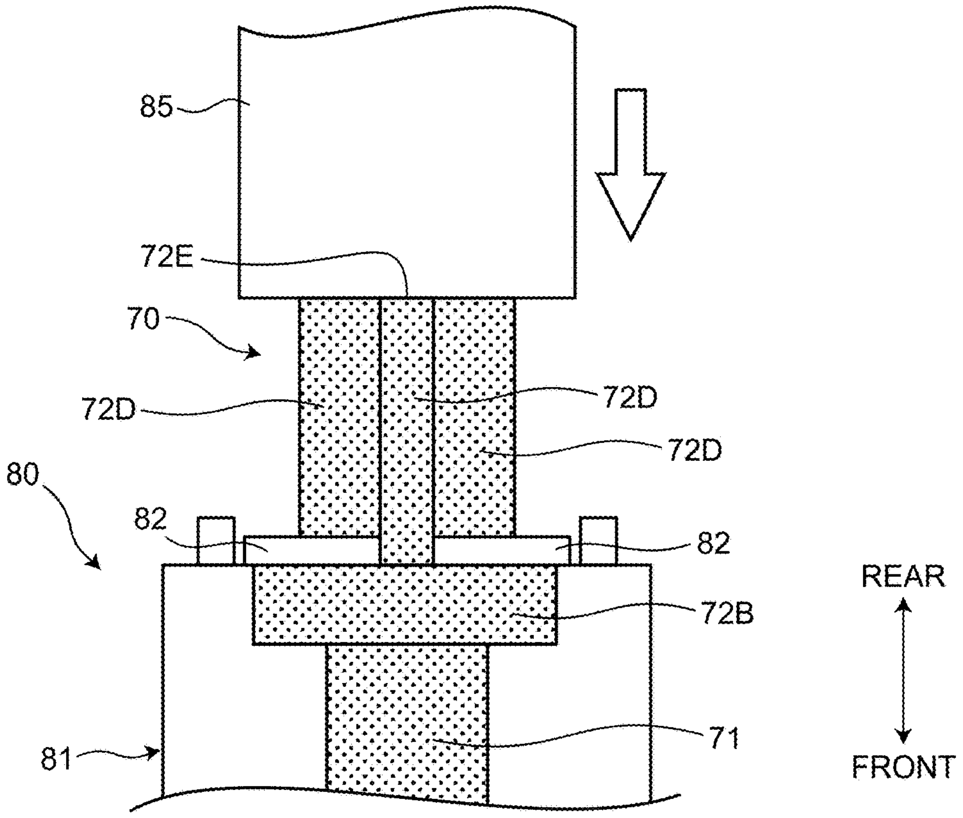
FIG. 13A shows one example of a first type of forging step according to the embodiment.
Figure 13B:
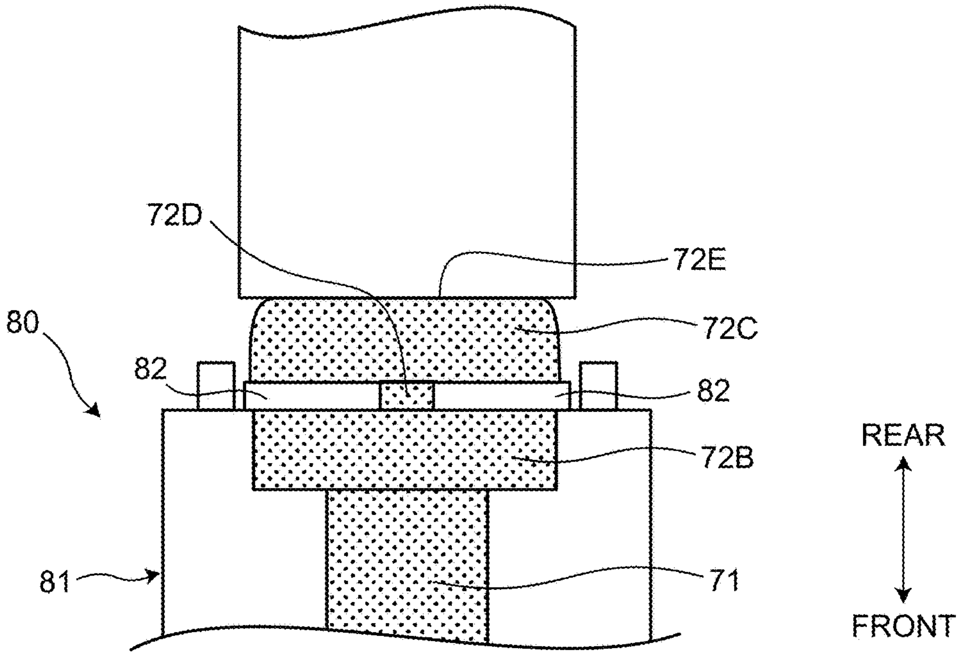
FIG. 13B shows one example of a second type of forging step according to the embodiment.

FIG. 13A and FIG. 13B show one example of the forging step S30 according to the embodiment. As shown in FIG. 13A, during the forging step S30, a press hammer 85, which has a diameter that is larger than the diameter of the flange-corresponding portion 72, is used to strike the rear-end portion 72E (i.e. the above-described upsetting method is performed). In this upsetting method, as shown in FIG. 13B, the entire rear-end portion 72E of the flange-corresponding portion 72 can be smashed flat, thereby causing plastic deformation of the rear-end portion 72E so as to spread in the radial direction along the slit-corresponding parts 82. This portion, which has been smashed flat and has spread, becomes a second flange-corresponding portion 72C, which corresponds to the second flange portion 8C and the cylindrical-shaped portion 8E of the spindle 8. In addition, the slit portions 81 are formed at the locations at which the slit-corresponding parts 82 are respectively disposed. After plastic deformation of the flange-corresponding portion 72, the slit-corresponding parts 82 are removed, and the processed (further forged) slug 70 is taken out of the housing part 83.

Figure 14A:
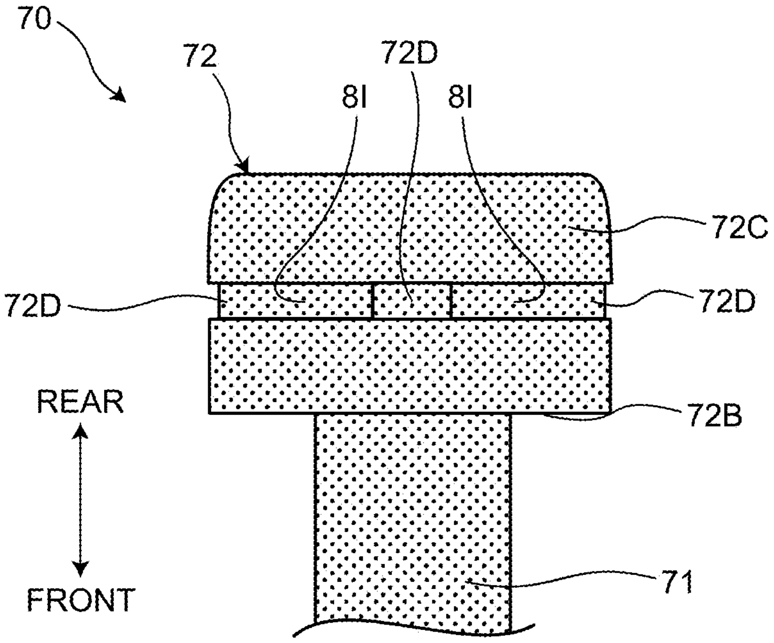
FIG. 14A shows one example of a first type of cutting step according to the embodiment.
Figure 14B:
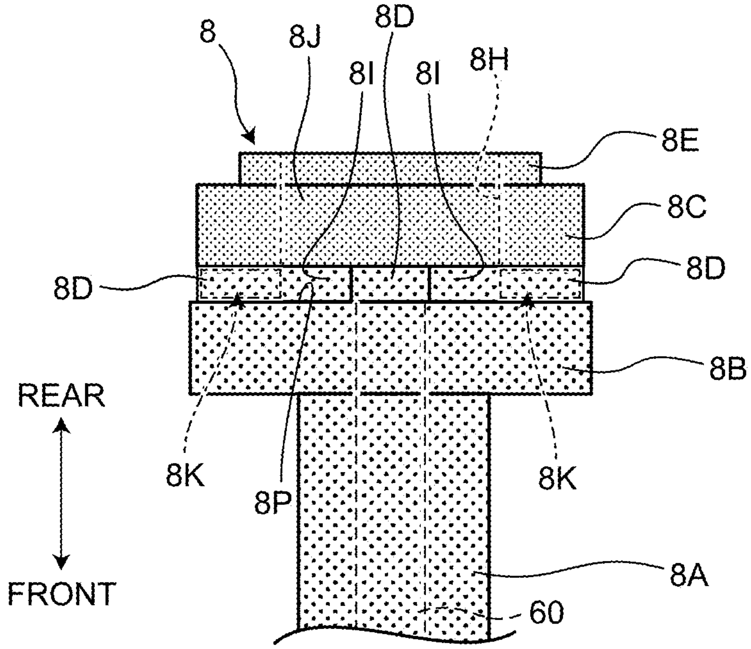
FIG. 14B shows one example of a second type of cutting step according to the embodiment.
Figure 14C:
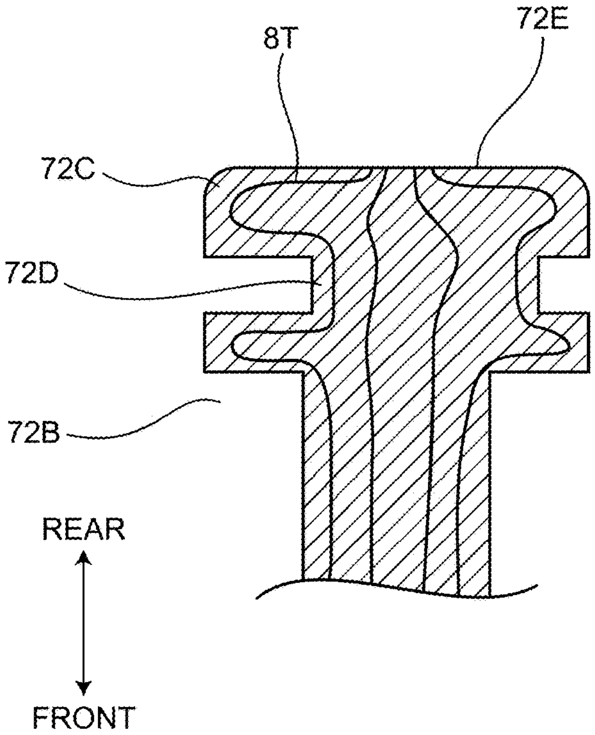
FIG. 14C schematically shows one example of grain flows in the solid portion of the spindle according to the embodiment.
Figure 14D:
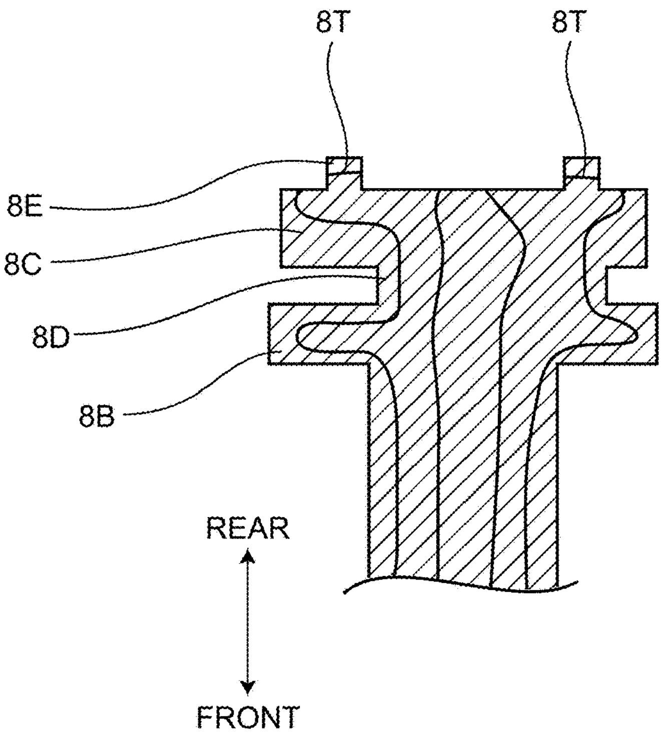
FIG. 14D schematically shows another example of grain flows in the solid portion of the spindle according to the second forging variation of the embodiment.

In the cutting step S40, the flange-corresponding portion 72—for the slug in which the flange-corresponding portion 72 plastically deformed—is cut. FIG. 14A and FIG. 14B show one example of the cutting step S40 according to the embodiment. As shown in FIG. 14A and FIG. 14B, during the cutting step S40, for example, radially inner-side portions of the coupling-corresponding portions 72D are cut, and radially outer-side portions are left to form the coupling portions 8D of the spindle 8 and connect the slit portions 81 at the radially inner-side portions. Additionally, the second flange portion 8C, the cylindrical-shaped portion 8E, and the insertion hole 8H are formed by cutting the second flange-corresponding portion 72C. The shaft-corresponding portion 71 and the first flange-corresponding portion 72B can be left as is to serve as the spindle-shaft portion 8A and the first flange portion 8B. It is noted that, as needed, the outer shapes of the first flange portion 8B and the coupling portions 8D may be adjusted by cutting the outer circumferences of the first flange-corresponding portion 72B and the coupling-corresponding portions 72D. In the cutting step S40, a cut surface 8J is formed on a surface of the portion that was cut. Additionally, the portions at which no cutting was performed in the cutting step S40—i.e., the portions facing the openings 8P, which are respectively surrounded by the first flange portion 8B, the second flange portion 8C, and the three coupling portions 8D—become the non-cut portions 8K. FIG. 14C schematically shows the grain flows in the solid portion of the spindle 8 formed according to the above-described upsetting method; FIG. 14D shows the spindle 8 of FIG. 14C after the above-described cutting step has been formed. As shown in FIG. 14C and FIG. 14D, in an embodiment in which forging is performed by the upsetting method as explained above with reference to FIG. 13A and FIG. 13B, the grain flows are formed spreading in the radial direction in the rear-end portion 72E. By performing cutting after forming the grain flows according to the upsetting method, the grain flows in the cylindrical-shaped portion 8E are separated (disconnected) from the other portions, in particular from the second flange portion 8C.

Figure 15A:
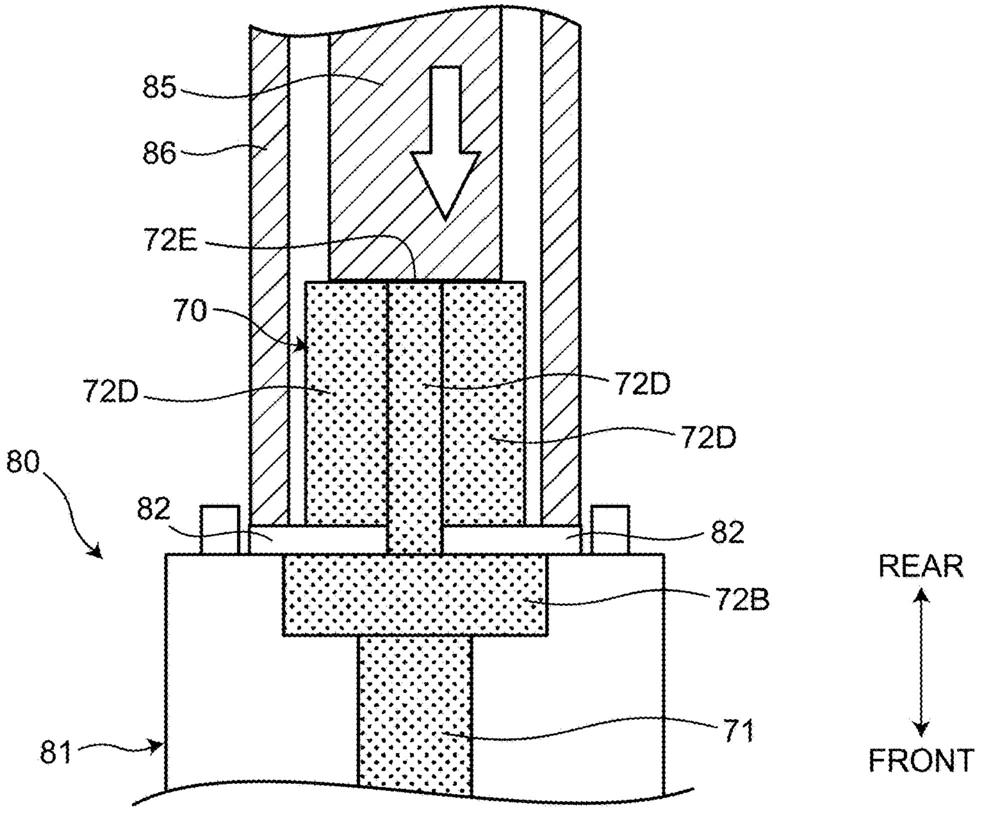
FIG. 15A showing an example of a forging step according to the first forging variation of the embodiment.
Figure 15B:
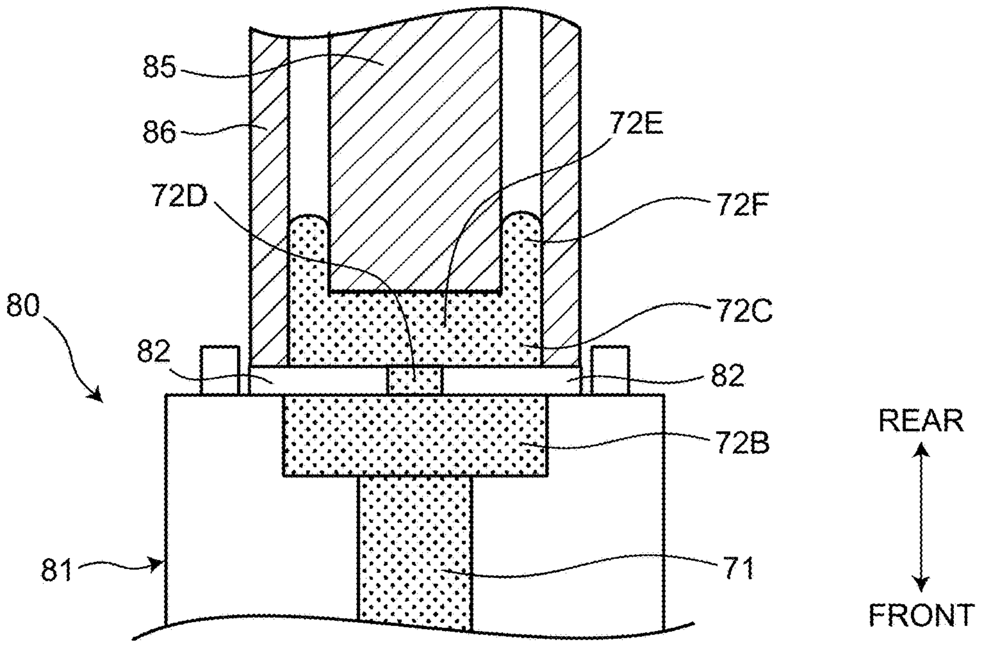
FIG. 15B shows another example of a forging step according to the second forging variation of the embodiment.

FIG. 15A and FIG. 15B show another example of the forging step S30 according to the above-described backward-extrusion method. As shown in FIG. 15A and FIG. 15B, during the forging step S30, the radially outer side of the flange-corresponding portion 72 is surrounded by a different die 86, and a press hammer 85, which is smaller than the diameter of the flange-corresponding portion 72, may be used to strike the center portion of the rear-end portion 72E to perform the backward-extrusion method. In this method, a center portion of the rear-end portion 72E of the flange-corresponding portion 72 can be smashed flat so as to be recessed relative to the circumferential-edge portion, thereby causing plastic deformation of the rear-end portion 72E so that the circumferential-edge portion (ridge portion 72F) rises rearward along the inner circumference of the die. By performing forging according to the backward-extrusion method, the shape of the outer circumference in the radial direction of the portion that becomes the second flange-corresponding portion 72C can be made into a shape that matches the die. It is noted that the rear-end portion 72E, from which the ridge portion 72F is formed, becomes a shape that matches the circular-cylindrical portion 8E.

Figure 16A:
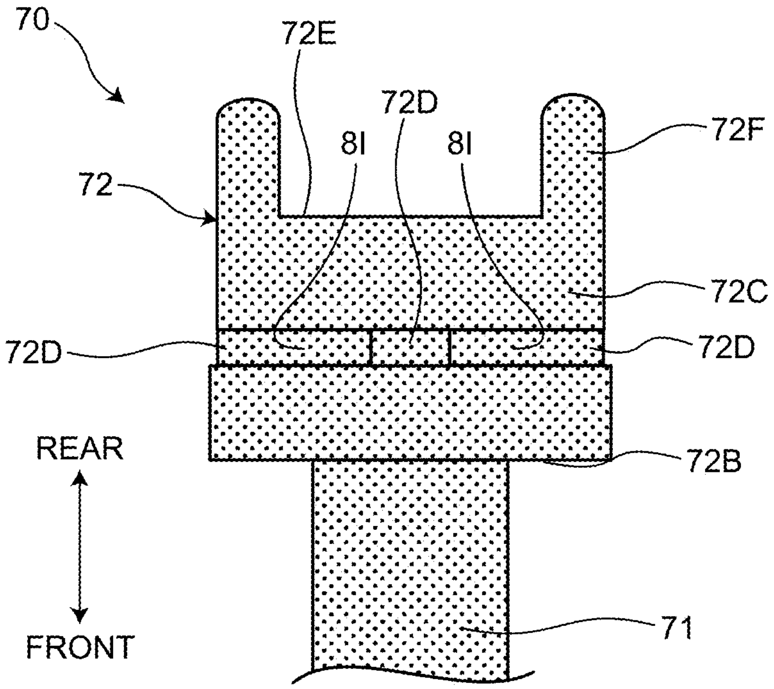
FIG. 16A shows an example of a cutting step according to the embodiment.
Figure 16B:
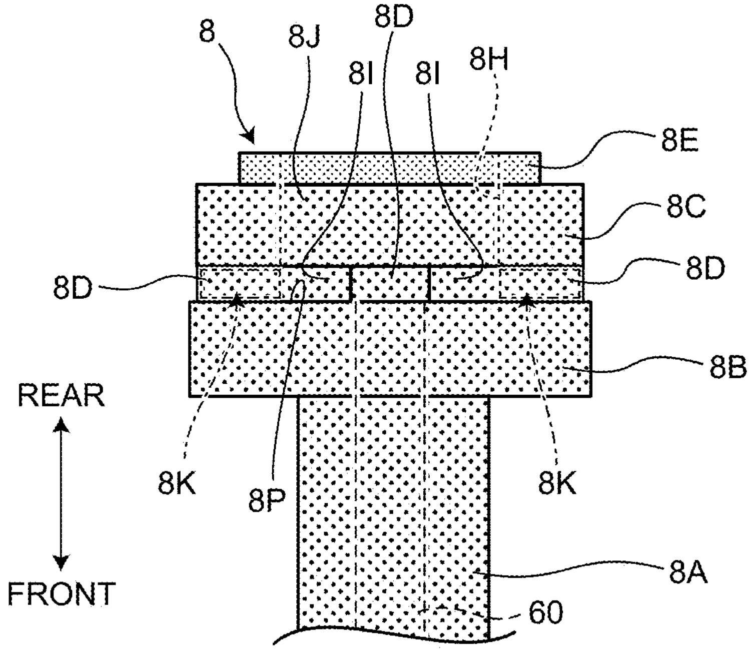
FIG. 16B shows another example of a cutting step according to the embodiment.
Figure 16C:
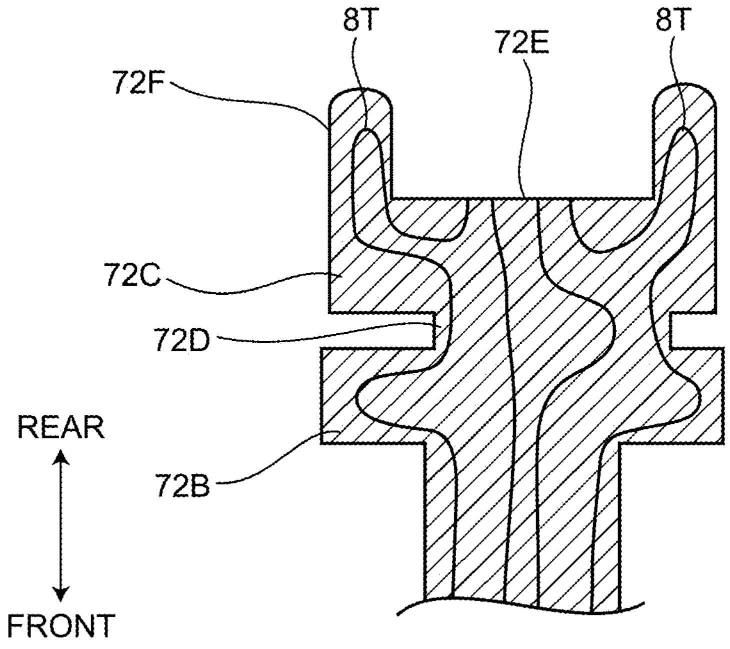
FIG. 16C schematically shows another example of grain flows in the solid portion of the spindle according to the second forging variation of the embodiment.
Figure 16D:
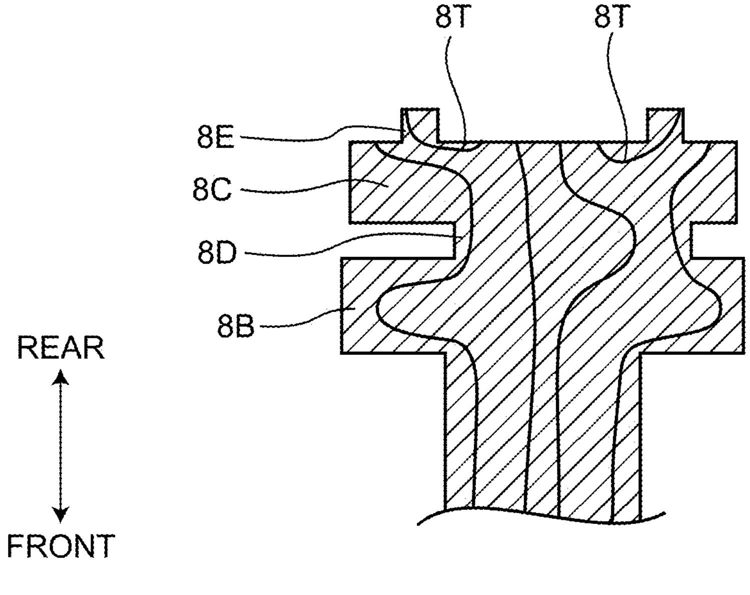
FIG. 16D schematically shows another example of the grain flows in the solid portion of the spindle according to the second forging variation of the embodiment.

FIG. 16A and FIG. 16B show another example of the cutting step S40. That is, in an embodiment in which the forging step S30 is performed using the above-described backward-extrusion method, in the cutting step S40, the flange-corresponding portion 72 is cut as shown in FIG. 16A and FIG. 16B. In the cutting step S40, the circular-cylindrical portion 8E is formed by, for example, cutting the ridge portion 72F. Additionally, for example, radially inner-side portions of the coupling-corresponding portions 72D are cut, and radially outer-side portions are left to form the coupling portions 8D of the spindle 8 and connect the slit portions 81 at the radially inner-side portions. Additionally, by cutting the second flange-corresponding portion 72C after the ridge portion 72F has been cut, the second flange portion 8C and the insertion hole 8H are formed. The shaft-corresponding portion 71 and the first flange-corresponding portion 72B can be left as is to serve as the spindle-shaft portion 8A and the first flange portion 8B. It is noted that, as needed, the outer shapes of the first flange portion 8B and the coupling portions 8D may be adjusted by cutting the outer circumferences of the first flange-corresponding portion 72B and the coupling-corresponding portions 72D. In the cutting step S40, a cut surface 8J is formed on a surface of the portion that was cut. Additionally, the portions at which no cutting was performed in the cutting step S40—i.e., the portions facing the three openings 8P, which are respectively surrounded by the first flange portion 8B, the second flange portion 8C, and the plurality of coupling portions 8D—become the non-cut portions 8K. FIG. 16C schematically shows the grain flows in the solid portion of the spindle 8 according to the embodiment formed using the backward-extrusion method; FIG. 16D shows the spindle 8 of FIG. 16C after the above-described cutting step has been performed. As shown in FIG. 16C and FIG. 16D, in an embodiment in which forging is performed using the backward-extrusion method, the grain flows are formed curving from the center portion of the rear-end portion 72E into the rear end of the ridge portion 72F. If the grain flows are formed in this manner, by cutting the ridge portion 72F to form the cylindrical-shaped portion 8E, the grain flows will be connected (continuous) from the center portion of the radial direction of the rear-end portion of the second flange portion 8C to the cylindrical-shaped portion 8E.

In the heat-treatment step S50, heat treatment is performed on the slug 70, after it has been forged and cut. During the heat-treatment step S50, the slug 70 is preferably subjected to a heat treatment such that the surface hardness of the cut slug 70 becomes 300 HV or more. Any process may be performed during the heat-treatment step S50 as long as it is a process in which heating is performed such that a property (preferably, the surface hardness thereof) of the material of the slug 70 changes, e.g., quenching—such as, immersion quenching, carburizing and quenching, carbonitriding and quenching, and induction hardening—or an age-hardening process, etc.

Next, the operation of the impact tool 1 will be explained. For example, when performing screw-tightening work on a work object (e.g., a screw), the tool accessory used for the screw-tightening work (a driver bit) is inserted into the tool hole 10C of the anvil 10. The tool accessory inserted into the tool hole 10C is held by the tool-holding mechanism 11. After the tool accessory is mounted on the anvil 10, the user grips the grip part 22 with, for example, their right hand and pulls the trigger lever 14 with the index finger of their right hand. When the trigger lever 14 is pulled, electric power is supplied from the battery pack 25 to the motor 6, the motor 6 starts, and the light assembly 18 turns ON at the same time. By starting the motor 6, the rotor shaft 33 of the rotor 27 rotates. When the rotor shaft 33 rotates, the rotational force of the rotor shaft 33 is transmitted to the planet gears 42 via the pinion gear 41. In the state in which the planet gears 42 are meshed with the inner teeth of the internal gear 43, the planet gears 42 revolve around the pinion gear 41 while rotating. The planet gears 42 are supported in a rotatable manner by the spindle 8 via the pins 42P. Owing to the revolving of the planet gears 42, the spindle 8 rotates at a rotational speed that is lower than the rotational speed of the rotor shaft 33.

In the state in which the hammer 47 and the anvil-projection portions 10B are in continuous contact with each other, when the spindle 8 rotates, the anvil 10 rotates together with the hammer 47 and the spindle 8. The screw-tightening work progresses owing to the rotation of the anvil 10.

The rotation of the anvil 10 and the hammer 47 momentarily stops when, owing to the progress of the screw-tightening work, a load greater than or equal to a prescribed value acts on the anvil 10. When the spindle 8 continues to rotate in the state in which the rotation of the hammer 47 is momentarily stopped, the hammer 47 moves rearward. Owing to the rearward movement of the hammer 47, contact between the hammer-projection portions 47D and the anvil-projection portions 10B is released. After moving rearward, the hammer 47 moves forward while rotating owing to the elastic force of the coil spring 49. The anvil 10 is impacted by the hammer 47 in the rotational direction owing to the hammer 47 moving forward while rotating. Thereby, the anvil 10 rotates about rotational axis AX with high torque. Consequently, the screw is tightened into the workpiece with higher torque.

As explained above, in the present embodiment, the impact tool 1 may comprise: the motor 6; the pinion gear 41 rotated by the motor 6; at least three planet gears 42, which mesh with the pinion gear 41; the internal gear 43, which meshes with the planet gears 42; the spindle 8 including the flange portion 8L—having the insertion hole 8H, which is in the axial direction for the insertion of the pinion gear 41, and the slit portions 81 in at least a side surface thereof for mounting the planet gears 42—and the spindle-shaft portion 8A extending forward from the flange portion 8L in the axial direction, the flange portion 8L having been shaped (formed) by forging; the hammer 47, which is held by the spindle 8; the anvil 10, which is impacted by the hammer 47 in the rotational direction; the hammer case 4, which houses the hammer 47 and holds the anvil 10 in a rotatable manner; the tool-accessory retaining part (tool-holding mechanism 11), which is provided on (in) the anvil 10; and the coil spring 49, which biases the hammer 47 toward the anvil 10 side.

In the above-mentioned configuration, it becomes possible to reduce the time required for manufacturing the impact tool 1 by employing a spindle 8, in which the flange portion 8L (in particular, the second flange portion 8C) was shaped (formed) by forging.

In the present embodiment, the flange portion 8L may have the cut surface 8J on at least a portion of a surface.

In the above-mentioned configuration, the accuracy of the outer shape of the spindle 8 can be improved, as needed and as appropriate, by cutting the surface of the flange portion 8L, which was shaped (formed) by forging.

The present embodiment may further comprise the balls 48 disposed between the spindle 8 and the hammer 47, and the spindle 8 may have, in the spindle-shaft portion 8A, the spindle grooves 8G in each of which at least a portion of the corresponding ball 48 is disposed.

In the above-mentioned configuration, the time required for manufacturing can be reduced when manufacturing the spindle 8 that has, in the spindle-shaft portion 8A, the spindle grooves 8G in each of which at least a portion of the corresponding ball 48 is disposed.

In the embodiment, the spindle 8 may be formed using a steel that contains 0.13% or more and 1.00% or less of carbon and 0.90% or more of chromium.

In the above-mentioned configuration, because it is possible to cause plastic deformation of the spindle as appropriate by forging, it becomes possible to ensure the post-deformation strength thereof.

In the present embodiment, the grain flows 8T in the flange portion 8L of the spindle 8 may be formed by forging such that the grain flows 8T go (extend) outward from the center of the radial direction.

In the above-mentioned configuration, because the flange portion 8L of the spindle 8 has the grain flows 8T formed by the forging going outward from the center of the radial direction, an appropriate strength of the spindle can be ensured.

In the present embodiment, the spindle 8 may have: the first flange portion 8B, which is connected to the spindle-shaft portion 8A; the second flange portion 8C, which is disposed opposing the first flange portion 8B rearward of the first flange portion 8B; and the (preferably, three) coupling portions 8D, which couple the first flange portion 8B and the second flange portion 8C to each other in the axial direction.

In the above-mentioned configuration, the time required for manufacturing can be reduced when manufacturing the spindle 8 configured to have the first flange portion 8B, the second flange portion 8C, and the coupling portions 8D.

In the present embodiment, the coupling portions 8D are disposed in (around) a circumferential direction; and each of the planet gears 42 may be disposed respectively between mutually adjacent coupling portions 8D at locations that are sandwiched between the first flange portion 8B and the second flange portion 8C.

In the above-mentioned configuration, the time required for manufacturing can be reduced when manufacturing the spindle 8 configured with each of the planet gears 42 disposed respectively between the mutually adjacent coupling portions 8D at locations sandwiched between the first flange portion 8B and the second flange portion 8C.

In the present embodiment, portions of the spindle 8 that face the openings 8P respectively surrounded (define) by the first flange portion 8B, the second flange portion 8C, and the coupling portions 8D may be the non-cut portions 8K; i.e. the openings 8P are formed solely by forging.

In the above-mentioned configuration, because the openings of the slit portions 8I can be formed as the non-cut portions 8K, respectively, cutting need not be performed when forming those openings.

In the present embodiment, the spindle 8 may be utilized in a power tool and may comprise the flange portion 8L—having the insertion hole 8H, which is in the axial direction for the insertion of the pinion gear 41, and the slit (slot) portions 81 in at least a side surface thereof for respectively mounting the planet gears 42—and the spindle-shaft portion 8A extending forward from the flange portion 8L, the flange portion 8L having been shaped (formed) by forging.

In the above-mentioned configuration, it becomes possible to reduce the time required for manufacturing the spindle 8 because the flange portion 8L was shaped by forging.

In the present embodiment, the flange portion 8L may have a cut surface 8J on at least a portion of a surface.

In the above-mentioned configuration, the accuracy of the outer shape of the spindle 8 can be improved, as needed and as appropriate, by cutting the surface of the flange portion 8L, which was shaped by forging.

In the present embodiment, the spindle-shaft portion 8A may have the spindle grooves 8G, in each of which at least a portion of the corresponding ball 48 is disposed.

In the above-mentioned configuration, the time required for manufacturing can be reduced when manufacturing the spindle 8 that has, in the spindle-shaft portion 8A, the spindle grooves 8G, in each of which at least a portion of the corresponding ball 48 is disposed.

In the present embodiment, the spindle 8 may be formed using a steel that contains 0.13% or more and 1.00% or less of carbon and 0.90% or more of chromium.

In the above-mentioned configuration, because it is possible to cause plastic deformation of the spindle as appropriate by forging, it becomes possible to ensure the post-deformation strength thereof.

In the present embodiment, the grain flows 8T in the flange portion 8L may be formed by the forging such that at least some of the grain flows 8T go (extend) outward from the center of the radial direction.

In the above-mentioned configuration, because the grain flows 8T in the flange portion 8L have been formed by forging to go (extend) outward from the center of the radial direction, an appropriate strength of the spindle can be ensured.

In the present embodiment, the flange portion 8L may have: the first flange portion 8B, which is connected to the spindle-shaft portion 8A; the second flange portion 8C, which is disposed opposing the first flange portion 8B rearward of the first flange portion 8B; and the coupling portions 8D, which couple the first flange portion 8B and the second flange portion 8C to each other in the axial direction.

In the above-mentioned configuration, the time required for manufacturing can be reduced when manufacturing the flange portion 8L of the spindle 8 configured to have the first flange portion 8B, the second flange portion 8C, and the coupling portions 8D.

In the present embodiment, the coupling portions 8D may be disposed in (around) a circumferential direction, and each of the planet gears 42 may be disposed respectively between mutually adjacent coupling portions 8D at a location sandwiched between the first flange portion 8B and the second flange portion 8C.

In the above-mentioned configuration, the time required for manufacturing can be reduced when manufacturing the spindle 8 configured with each of the planet gears 42 disposed respectively between the mutually adjacent coupling portions 8D at a location sandwiched between the first flange portion 8B and the second flange portion 8C.

In the present embodiment, portions of the flange portion 8L that face the openings 8P surrounded by the first flange portion 8B, the second flange portion 8C, and the plurality of coupling portions 8D may be the non-cut portions 8K.

In the above-mentioned configuration, because the openings of the slit portions 8I can be formed as the non-cut portions 8K, respectively, cutting need not be performed when forming those openings.

In the present embodiment, in the method of manufacturing the spindle 8, which comprises the flange portion 8L—having the insertion hole 8H, which is in the axial direction for the insertion of the pinion gear 41, and the slit portions 81 in at least a side surface thereof for mounting the planet gears 42—and the spindle-shaft portion 8A, which extends forward from the flange portion 8L, the spindle 8 being used in a power tool, the manufacturing method may comprise: (i) forming the slug 70, which has the flange-corresponding portion 72 and the shaft-corresponding portion 71 that correspond to the flange portion 8L and the spindle-shaft portion 8A, respectively; (ii) disposing, with respect to the flange-corresponding portion 72 of the slug 70, the forging die 80 in which the slit-corresponding parts 82, which correspond to the slit portions 81, are formed; and (iii) forming the slit portions 81 by forging, in which the rear-end portion 72E of the flange-corresponding portion 72 is struck in the axial direction in the state in which the forging die 80 is disposed to cause plastic deformation of the flange-corresponding portion 72 along the slit-corresponding parts 82 of the forging die 80.

In the above-mentioned configuration, in the state in which the forging die 80—in which the slit-corresponding part 82, which corresponds to the slit portions 81, is formed—is disposed with respect to the flange-corresponding portion 72 of the slug 70, the slit portions 81 are formed by forging, in which the rear-end portion 72E of the flange-corresponding portion 72 is struck in the axial direction to cause plastic deformation of the flange-corresponding portion 72 along the slit-corresponding parts 82 of the forging die 80. Accordingly, the time required for manufacturing the spindle 8 can be reduced because the slit portions 8I can be formed efficiently by forging.

In the present embodiment, the flange portion 8L of the spindle 8 may have the insertion hole 8H in the axial direction for the insertion of the pinion gear 41, and the manufacturing method may further comprise forming the insertion hole 8H by cutting the flange-corresponding portion 72 after the plastic deformation of the flange-corresponding portion 72.

In the above-mentioned configuration, because the insertion hole 8H is formed by cutting after the slit portions 8I have been formed by forging, the time required for manufacturing the spindle 8 can be reduced compared to an embodiment in which both the slit portions 81 and the insertion hole 8H are formed by cutting.

In the present embodiment, the slug 70 may be formed by forging in the state in which the temperature of the material is −20° C. or higher and 40° C. or lower, 300° C. or higher and 850° C. or lower, or 1,000° C. or higher and 1,250° C. or lower, and the spindle 8 may be formed by forging in the state in which the temperature of the formed slug 70 is −20° C. or higher and 40° C. or lower.

In the above-mentioned configuration, the slug 70 can be manufactured appropriately, and the spindle 8 can be appropriately manufactured using that appropriately manufactured slug 70.

In the present embodiment, the spindle 8 may be formed so that the surface hardness thereof after formation by forging becomes 300 HV or more by heat treatment.

In the above-mentioned configuration, it becomes possible to ensure the strength of the spindle 8 because the surface hardness thereof after formation by forging becomes 300 HV or more owing to the heat treatment.

In the embodiment described above, the power supply of the impact tool 1 is not required to be the battery pack 25 and may be a commercial power supply (AC power supply).

In the embodiment described above, the power tool is assumed to be the impact tool 1, and the impact tool 1 is assumed to be an impact driver. The impact tool 1 may be an impact wrench. Additionally, the power tool may be a driver-drill, a polisher, a pin cutter, or a hammer drill.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved spindles for, e.g., impact tools and similar power tools.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

S10 Slug-manufacturing step
S20 Die-arranging step
S30 Forging step
S40 Cutting step
AX Rotational axis
1 Impact tool
2 Housing
2L Left housing
2R Right housing
2S, 3S, 30S Screws
3 Rear cover
4 Hammer case
4A Large-tube portion
4B Small-tube portion
6 Motor
7 Speed-reducing mechanism
8 Spindle
8A Spindle-shaft portion
8B First flange portion
8C Second flange portion
8D Coupling portion
8E Cylindrical-shaped portion
8F Spindle-protrusion portion
8G Spindle groove
8H Insertion hole
8I Slit portion
8J Cut surface
8K Non-cut portion
8L Flange portion
8S Outer circumferential surface
8T Grain flow
9 Impact mechanism
10 Anvil
10A Anvil-shaft portion
10B Anvil-projection portion
10C Tool hole
10D Anvil recessed portion
11 Tool-holding mechanism
12 Fan
12A Bushing
13 Battery-mounting part
14 Trigger lever
15 Forward/reverse-change lever
16 Interface panel
16A Manipulatable button
17 Quick mode-switching button
18 Light assembly
19 Air-intake port
20 Air-exhaust port
21 Motor-housing part
22 Grip part
23 Battery-holding part
24 Bearing box
24A Rear-side, ring-shaped portion
25 Battery pack
26 Stator
27 Rotor
28 Stator core
29 Rear-side insulator
30 Front-side insulator
31 Coil
32 Rotor core
33 Rotor shaft
34A Rotor magnet
34B Sensor magnet
35 Sensor board
36 Fusing terminal
37 Rear-side rotor bearing
38 Front-side rotor bearing
41 Pinion gear
42 Planet gear
42P Pin
43 Internal gear
44 Spindle bearing
45 O-ring
46 Anvil bearing
47 Hammer
47A Body portion
47C Inner-tube portion
47D Hammer-projection portion

47E Recessed portion
47G Hammer groove
47S Inner-circumferential surface
48, 54 Balls
49 Coil spring
50, 56 Washers
51 Hammer-case cover
52 Bumper
57 Support member
60 Interior space
70 Slug
71 Shaft-corresponding portion
72 Flange-corresponding portion
72B First flange-corresponding portion
72C Second flange-corresponding portion
72D Coupling-corresponding portion
72E Rear-end portion
80 Forging die
81 Slug-support part
82 Slit-corresponding part
83 Housing part
84 Tab part
85 Press hammer

The invention claimed is:

1. An impact tool comprising:

a motor;

a sun gear rotated by the motor;

at least three planet gears, which mesh with the sun gear;

an internal gear, which meshes with the planet gears;

a spindle, which includes a flange portion—having a hole in an axial direction in which the sun gear is inserted, and slit portions in at least a side surface thereof in which the planet gears are mounted—and a shaft portion extending forward from the flange portion in the axial direction, at least a portion of the flange portion having been shaped by forging;

a hammer, which is held on the spindle;

an anvil configured to be impacted by the hammer in a rotational direction;

a hammer case, which houses the hammer and holds the anvil in a rotatable manner;

a tool-accessory retaining part, which is provided on the anvil; and a coil spring, which biases the hammer toward the anvil;

wherein grain flows in the flange portion of the spindle are formed by the forging to extend outward from the center of the radial direction.

2. The impact tool according to claim 1, wherein the flange portion has a cut surface on at least a portion of a surface.

3. The impact tool according to claim 1, further comprising:

a ball disposed between the spindle and the hammer;

wherein the spindle has, in the shaft portion, a spindle groove in which at least a portion of the ball is disposed.

4. The impact tool according to claim 1, wherein the spindle is formed using a steel that contains 0.13-1.00 mass % carbon and at least 0.90 mass % chromium.

5. The impact tool according to claim 1, wherein the spindle has:

a first flange connected to the shaft portion;

a second flange disposed opposing the first flange and rearward of the first flange; and at least one coupling portion, which connects the first flange and the second flange to each other in the axial direction.

6. The impact tool according to claim 5, wherein:

a plurality of the coupling portions is arranged in the circumferential direction and connects the first flange and the second flange to each other in the axial direction; and each of the planet gears is disposed respectively between mutually adjacent coupling portions at a location sandwiched between the first flange and the second flange.

7. The impact tool according to claim 5, wherein portions of the spindle that face openings surrounded by the first flange, the second flange, and the plurality of coupling portions are non-cut portions.

8. A spindle used in a power tool, comprising:

a flange portion having a hole in an axial direction for the insertion of a sun gear, and slit portions in at least a side surface thereof for mounting planet gears; and a shaft portion extending forward from the flange portion;

wherein the flange portion has been shaped by forging.

9. The spindle according to claim 8, wherein the flange portion has a cut surface on at least a portion of a surface.

10. The spindle according to claim 8, wherein the shaft portion has a spindle groove in which at least a portion of a ball is disposed.

11. The spindle according to claim 8, wherein the spindle is formed using a steel that contains 0.13-1.00 mass % carbon and at least 0.90 mass % chromium.

12. The spindle according to claim 8, wherein grain flows in the flange portion are formed by the forging to extend outward from the center of the radial direction.

13. The spindle according to claim 8, wherein the flange portion has:

a first flange connected to the shaft portion;

a second flange disposed opposing the first flange and rearward of the first flange; and a coupling portion, which couples the first flange and the second flange to each other in the axial direction.

14. The spindle according to claim 13, wherein:

a plurality of the coupling portions is disposed in a circumferential direction; and each of the planet gears is disposed respectively between mutually adjacent coupling portions at a location sandwiched between the first flange and the second flange.

15. The spindle according to claim 13, wherein portion of the flange that face openings surrounded by the first flange, the second flange, and the plurality of coupling portions are non-cut portions.

16. A method of manufacturing a spindle comprising a flange portion—having a hole in an axial direction for the insertion of a sun gear, and a slit portion in at least a side surface thereof for mounting a planet gear—and a shaft portion extending forward from the flange portion, the spindle being used in a power tool, the manufacturing method comprising:

providing a slug, which has a flange-corresponding portion and a shaft-corresponding portion that correspond to the flange portion and the shaft portion, respectively;

disposing, with respect to the flange-corresponding portion of the slug, a die in which a slit-corresponding part, which corresponds to the slit portion, is formed; and forming the slit portion by forging, in which, in the state in which the die is disposed, a rear-end portion of the flange-corresponding portion is struck in the axial direction to cause plastic deformation of the flange-corresponding portion along the slit-corresponding part of the die.

17. The method according to claim 16, further comprising:

forming the hole by cutting the flange-corresponding portion after the plastic deformation of the flange-corresponding portion.

18. The method according to claim 16, wherein:

the slug is formed by forging in the state in which the temperature of the material is −20° C. or higher and 40° C. or lower, 300° C. or higher and 850° C. or lower, or 1,000° C. or higher and 1,250° C. or lower; and the spindle is formed by forging in which the temperature of the formed slug is −20° C. or higher and 40° C. or lower.

19. The method according to claim 16, further comprising:

heat treating the spindle after formation by forging until the surface hardness of the spindle becomes 300 HV or more.

20. The impact tool according to claim 5, wherein both the first flange and the second flange have been shaped by forging such that grain flows in the first flange and the second flange extend outward from the center of the radial direction.

* * * * *